(12) United States Patent
Kobayashi et al.

(10) Patent No.: US 12,160,678 B2
(45) Date of Patent: *Dec. 3, 2024

(54) IMAGING ELEMENT, IMAGING APPARATUS, OPERATION METHOD OF IMAGING ELEMENT, AND PROGRAM

(71) Applicant: FUJIFILM CORPORATION, Tokyo (JP)

(72) Inventors: Makoto Kobayashi, Saitama (JP); Tomoyuki Kawai, Saitama (JP); Hitoshi Sakurabu, Saitama (JP); Ryo Hasegawa, Saitama (JP); Kazufumi Sugawara, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,264

(22) Filed: Oct. 2, 2023

(65) Prior Publication Data

US 2024/0031706 A1 Jan. 25, 2024

Related U.S. Application Data

(63) Continuation of application No. 17/397,994, filed on Aug. 10, 2021, now Pat. No. 11,812,177, which is a
(Continued)

(30) Foreign Application Priority Data

Feb. 20, 2019 (JP) .................. 2019-028842

(51) Int. Cl.
*H04N 25/772* (2023.01)
*H04N 23/60* (2023.01)
*H04N 25/71* (2023.01)

(52) U.S. Cl.
CPC ......... *H04N 25/772* (2023.01); *H04N 23/665* (2023.01); *H04N 25/71* (2023.01)

(58) Field of Classification Search
CPC .... H04N 25/772; H04N 23/665; H04N 25/71; H04N 23/63; H04N 23/73; H04N 25/79
See application file for complete search history.

(56) References Cited

U.S. PATENT DOCUMENTS 6,985,181 B2 * 1/2006 Ewedemi ............. H04N 23/665
348/E3.018
11,812,177 B2 * 11/2023 Kobayashi ........... H04N 25/772
(Continued)

FOREIGN PATENT DOCUMENTS

CN 101256763 A 9/2008
CN 102088556 A 6/2011
(Continued)

OTHER PUBLICATIONS

International Search Report issued in International Application No. PCT/JP2020/002928 on Mar. 24, 2020.
(Continued)

*Primary Examiner* — Albert H Cutler
(74) *Attorney, Agent, or Firm* — SOLARIS Intellectual Property Group, PLLC

(57) ABSTRACT

An imaging element comprises a first communication interface that is incorporated in the imaging element and outputs first image data based on image data obtained by imaging a subject to an external processor, a memory that is incorporated in the imaging element and stores the image data, and a second communication interface that is incorporated in the imaging element and outputs second image data based on the image data stored in the memory to the external proces-
(Continued)

sor, in which an output method of the first communication interface and an output method of the second communication interface are different.

18 Claims, 24 Drawing Sheets

Related U.S. Application Data continuation of application No. PCT/JP2020/002928, filed on Jan. 28, 2020.

(56) References Cited

U.S. PATENT DOCUMENTS

| | | |
|---|---|---|
| 2008/0165268 A1 | 7/2008 | Takahashi et al. |
| 2011/0285866 A1* | 11/2011 | Bhrugumalla ....... H04N 23/951 348/E5.024 |
| 2013/0286250 A1* | 10/2013 | Kumar .................. H04N 5/772 348/E5.024 |
| 2016/0381338 A1 | 12/2016 | Liu et al. |
| 2017/0374275 A1 | 12/2017 | Shimokura et al. |
| 2019/0114997 A1 | 4/2019 | Okamoto |
| 2019/0204448 A1* | 7/2019 | Eki ........................ H04N 25/75 |

FOREIGN PATENT DOCUMENTS

| | | |
|---|---|---|
| CN | 109074784 A | 12/2018 |
| JP | 2008-035307 A | 2/2008 |
| JP | 2015-148676 A | 8/2015 |
| JP | 2018-6806 A | 1/2018 |
| WO | 2018/051809 A1 | 3/2018 |

OTHER PUBLICATIONS

Written Opinion of the ISA issued in International Application No. PCT/JP2020/002928 on Mar. 24, 2020.
International Preliminary Report on Patentability issued in International Application No. PCT/JP2020/002928 on Sep. 8, 2020.
Non-Final Office Action issued by USPTO on Feb. 23, 2023, in related U.S. Appl. No. 17/379,994.
Notice of Allowance issued by USPTO on Jul. 6, 2023, in related U.S. Appl. No. 17/397,994.
English language translation of the following: Office action dated Oct. 21, 2023 from the SIPO in a Chinese patent application No. 202080015096.2 corresponding to the instant patent application. This office action translation is submitted now in order to supplement the understanding of the cited references which are being disclosed in the instant Information Disclosure Statement.

* cited by examiner

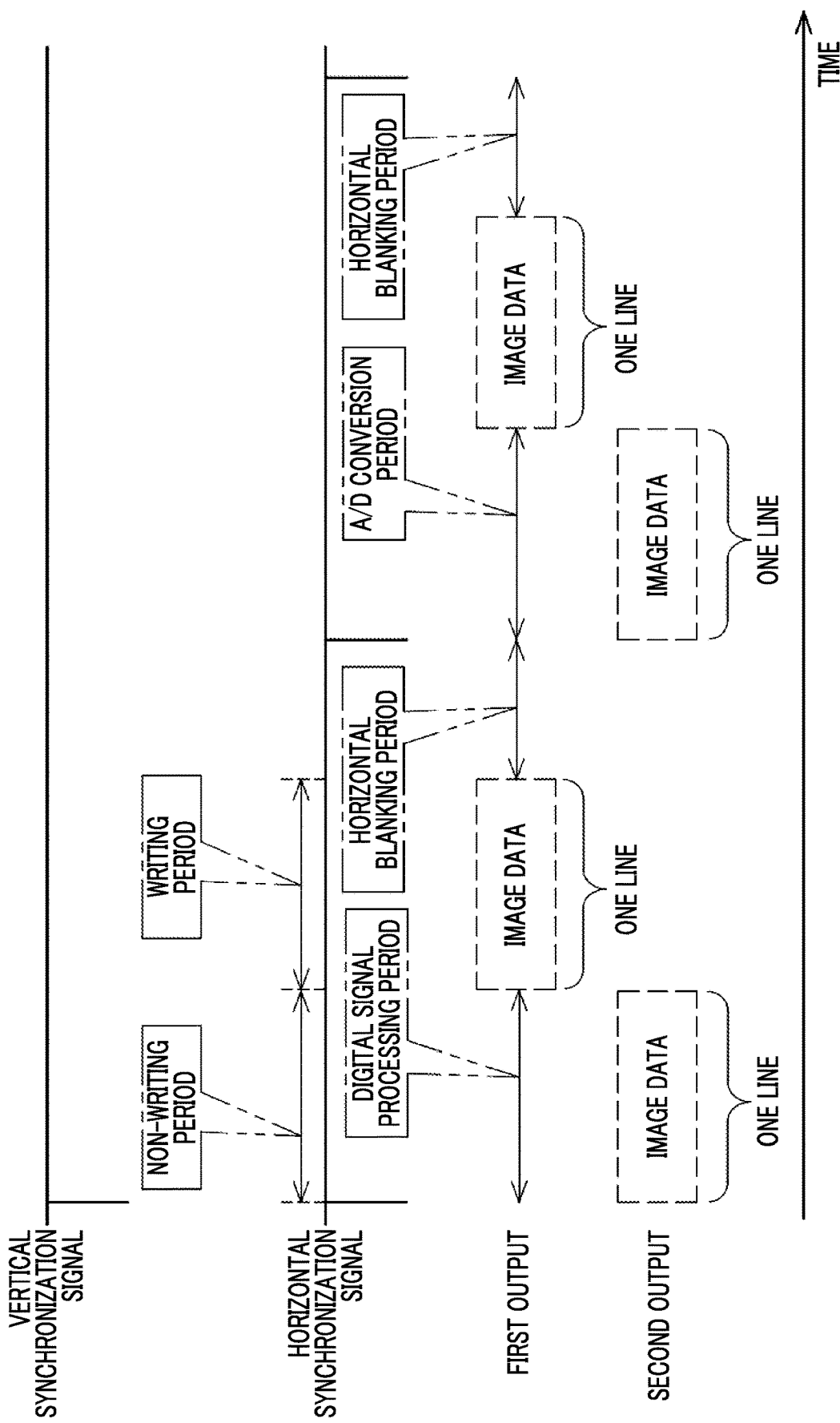

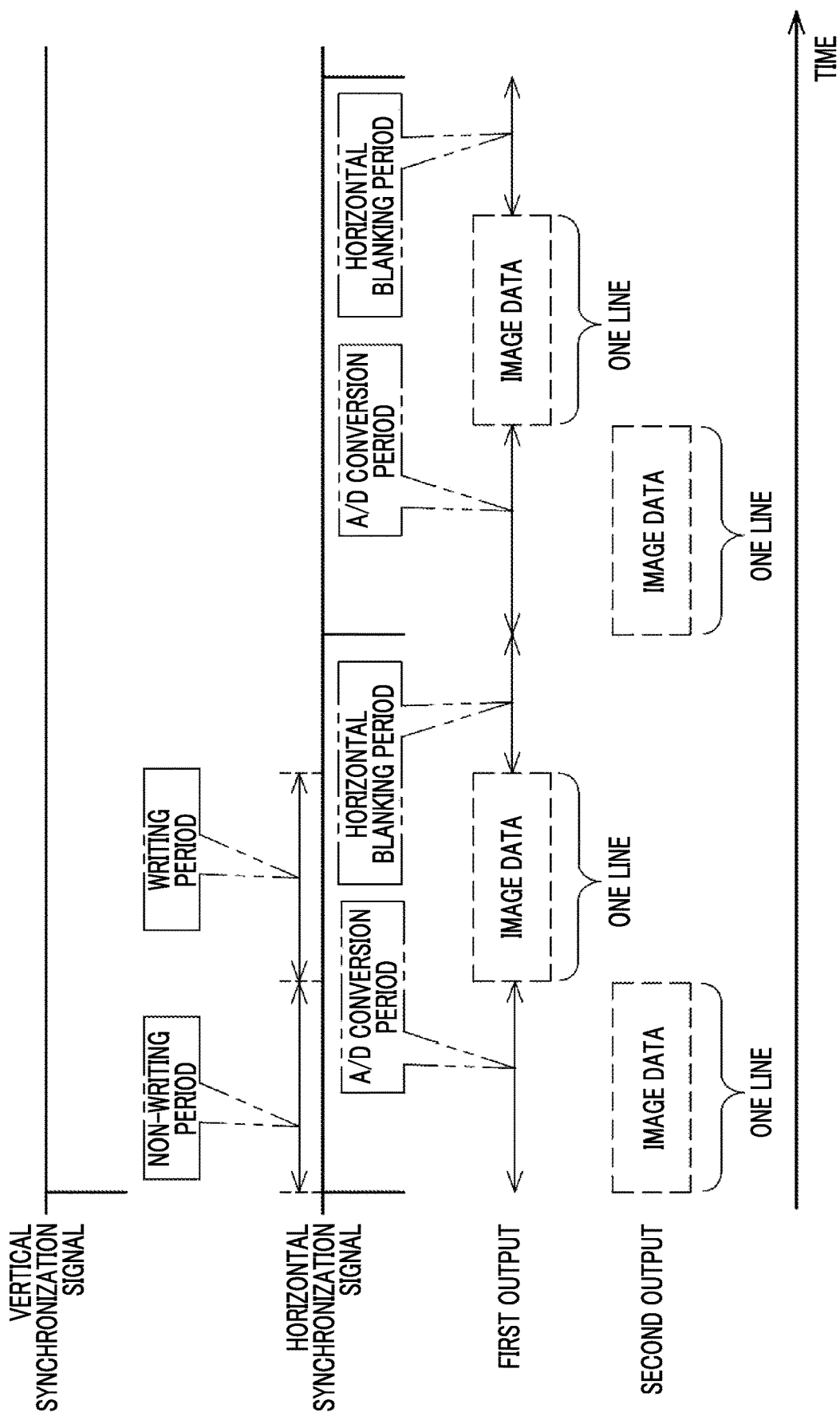

IMAGING ELEMENT, IMAGING APPARATUS, OPERATION METHOD OF IMAGING ELEMENT, AND PROGRAM

CROSS-REFERENCE TO RELATED APPLICATIONS

This application is a continuation application of, and claims priority to, U.S. application Ser. No. 17/397,994, filed Aug. 10, 2021, which is a continuation application of International Application No. PCT/JP2020/002928, filed Jan. 28, 2020, the disclosure of which is incorporated herein by reference in its entirety. Further, this application claims priority from Japanese Patent Application No. 2019-028842, filed Feb. 20, 2019, the disclosure of which is incorporated herein by reference in its entirety.

BACKGROUND

1. Technical Field

The technology of the present disclosure relates to an imaging element, an imaging apparatus, an operation method of an imaging element, and a program.

2. Related Art

JP2018-6806A discloses an imaging apparatus including a laminated image sensor including a sensor portion, a first logic portion, and a first memory portion; and a second logic portion.

The sensor portion is a so-called complementary metal oxide semiconductor (CMOS) image sensor unit. The sensor portion converts received light into an electric signal. The sensor portion digitizes the electric signal and transmits RAW data obtained by digitizing to the first logic portion.

The first logic portion comprises a first memory control portion, a first inter-chip communication interface (I/F), a simple development portion, and a first display control portion. The first memory control portion is a so-called memory controller and writes the RAW data from the sensor portion into the first memory portion. The first inter-chip communication I/F accesses the first memory portion through the first memory control portion and transfers the RAW data read out from the first memory portion to the second logic portion. The simple development portion generates display data displayable on a display portion by accessing the first memory portion through the first memory control portion and performing development processing on the RAW data read out from the first memory portion. The simple development portion writes the display data back to the first memory portion through the first memory control portion. The first display control portion reads out the display data from the first memory portion and outputs, while reading, the display data to the second logic portion through the first memory control portion.

In such a manner, in the imaging apparatus disclosed in JP2018-6806A, image data is output to the second logic portion from the laminated image sensor through each of two output paths.

SUMMARY

An embodiment according to the technology of the present disclosure provides an imaging element, an imaging apparatus, an operation method of an imaging element, and a program capable of suppressing a delay in output of image data, compared to a case where the image data is output to a processing portion (external processor arranged on an outside of the imaging element) from only a single communication TIE A first aspect according to the technology of the present disclosure is an imaging element comprising a first output portion that is incorporated in the imaging element and outputs first image data based on image data obtained by imaging a subject to a processing portion on an outside of the imaging element, a storage portion that is incorporated in the imaging element and stores the image data, and a second output portion that is incorporated in the imaging element and outputs second image data based on the image data stored in the storage portion to the processing portion on the outside, in which an output method of the first output portion and an output method of the second output portion are different. Accordingly, even in a case where the image data is stored in the storage portion, the image data can be output without delay.

A second aspect according to the technology of the present disclosure is the imaging element according to the first aspect, in which output of the first image data by the first output portion and output of the second image data by the second output portion are performed independently of each other. Accordingly, an output timing of the first image data for the processing portion and an output timing of the second image data for the processing portion can be freely changed.

A third aspect according to the technology of the present disclosure is the imaging element according to the first aspect, in which the first output portion outputs the first image data in a period different from a period of output of the second image data by the second output portion. Accordingly, the image data can be output to the processing portion without delay.

A fourth aspect according to the technology of the present disclosure is the imaging element according to the third aspect, in which the second output portion outputs the second image data in response to a request from the processing portion on the outside. Accordingly, output of the second image data to the processing portion regardless of the processing portion not in a state of receiving the second image data can be avoided.

A fifth aspect according to the technology of the present disclosure is the imaging element according to the third or fourth aspect, in which the period of output is a vertical blanking period after the first image data of one frame is output from the first output portion. Accordingly, a delay in output of the image data from the imaging element to the processing portion due to a writing operation for the storage portion can be avoided.

A sixth aspect according to the technology of the present disclosure is the imaging element according to the third or fourth aspect, in which the period of output is a vertical blanking period before the first image data of one frame is output from the first output portion. Accordingly, a delay in output of the image data from the imaging element to the processing portion due to the writing operation for the storage portion can be avoided.

A seventh aspect according to the technology of the present disclosure is the imaging element according to the third or fourth aspect, in which the period of output is a horizontal blanking period after the first image data of one line is output from the first output portion. Accordingly, a delay in output of the image data from the imaging element to the processing portion due to the writing operation for the storage portion can be avoided.

An eighth aspect according to the technology of the present disclosure is the imaging element according to the third or fourth aspect, in which the period of output is a horizontal blanking period before the first image data of one line is output from the first output portion. Accordingly, a delay in output of the image data from the imaging element to the processing portion due to the writing operation for the storage portion can be avoided.

A ninth aspect according to the technology of the present disclosure is the imaging element according to the third or fourth aspect, further comprising a first A/D converter that performs A/D conversion on analog image data, in which the period of output is an A/D conversion period of the first A/D converter before the first image data of one line is output from the first output portion. Accordingly, a delay in output of the image data from the imaging element to the processing portion due to the writing operation for the storage portion can be avoided.

A tenth aspect according to the technology of the present disclosure is the imaging element according to any one of the first to ninth aspects, further comprising a second A/D converter that performs A/D conversion on analog image data, and a memory controller that stores digital image data obtained by digitizing the analog image data by the second A/D converter in the storage portion, in which the output method of the first output portion is an output method of outputting the digital image data obtained from the second A/D converter as the first image data without storing the digital image data in the storage portion, and the output method of the second output portion is an output method of outputting the digital image data read out from the storage portion by the memory controller as the second image data. Accordingly, even in a period in which the image data is written into the storage portion, output from the imaging element to the processing portion can be continued.

An eleventh aspect according to the technology of the present disclosure is the imaging element according to any one of the first to tenth aspects, in which the storage portion is a memory of which a writing timing and a reading timing are different. Accordingly, even in a case where the storage portion is the memory of which the writing timing and the reading timing are different, output from the imaging element to the processing portion can be continued.

An twelfth aspect according to the technology of the present disclosure is the imaging element according to the tenth aspect, in which the storage portion is a DRAM. Accordingly, even in a case where the storage portion is the DRAM, output from the imaging element to the processing portion can be continued.

A thirteenth aspect according to the technology of the present disclosure is the imaging element according to any one of the first to twelfth aspects, in which at least a photoelectric conversion element and the storage portion are formed in one chip. Accordingly, portability of the imaging element is increased, compared to an imaging element in which the photoelectric conversion element and the storage portion are not formed in one chip.

A fourteenth aspect according to the technology of the present disclosure is the imaging element according to the thirteenth aspect, in which the imaging element is a laminated imaging element in which the photoelectric conversion element is laminated with the storage portion. Accordingly, a transfer speed of the image data from the photoelectric conversion element to the storage portion can be increased, compared to a case of not laminating the photoelectric conversion element and the storage portion.

A fifteenth aspect according to the technology of the present disclosure is an imaging apparatus comprising the imaging element according to any one of the first to fourteenth aspects, and a display control portion that performs a control for displaying at least one of a first image based on the first image data output by the first output portion or a second image based on the second image data output by the second output portion on a display portion. Accordingly, even in a case where the image data is stored in the storage portion, the image data can be output without delay.

A sixteenth aspect according to the technology of the present disclosure is an imaging apparatus comprising the imaging element according to any one of the first to fourteenth aspects, and a storage control portion that performs a control for storing at least one of the first image data output by the first output portion or the second image data output by the second output portion in a storage device. Accordingly, even in a case where the image data is stored in the storage portion, the image data can be output without delay.

A seventeenth aspect according to the technology of the present disclosure is an operation method of an imaging element incorporating a first output portion, a storage portion, and a second output portion, the operation method comprising, by the first output portion, outputting first image data based on image data obtained by imaging a subject to a processing portion on an outside of the imaging element, by the storage portion, storing the image data, and by the second output portion, outputting second image data based on the image data stored in the storage portion to the processing portion on the outside, in which an output method of the first output portion and an output method of the second output portion are different. Accordingly, even in a case where the image data is stored in the storage portion, the image data can be output without delay.

An eighteenth aspect according to the technology of the present disclosure is a program causing a computer to function as a first output portion and a second output portion included in an imaging element incorporating the first output portion, a storage portion, and the second output portion, the program comprising, by the first output portion, outputting first image data based on image data obtained by imaging a subject to a processing portion on an outside of the imaging element, by the storage portion, storing the image data, and by the second output portion, outputting second image data based on the image data stored in the storage portion to the processing portion on the outside, in which an output method of the first output portion and an output method of the second output portion are different. Accordingly, even in a case where the image data is stored in the storage portion, the image data can be output without delay.

A nineteenth aspect according to the technology of the present disclosure is an imaging element incorporating a first processor, a memory, and a second processor, in which the first processor is configured to output first image data based on image data obtained by imaging a subject to a processing portion on an outside of the imaging element, the memory stores the image data, the second processor is configured to output second image data based on the image data stored in the memory to the processing portion on the outside, and an output method of the first processor and an output method of the second processor are different. Accordingly, even in a case where the image data is stored in the storage portion, the image data can be output without delay.

BRIEF DESCRIPTION OF THE DRAWINGS

Exemplary embodiments of the technology of the disclosure will be described in detail based on the following figures, wherein:

FIG. 23A is a time chart illustrating an example of an aspect of performing the second output in a digital signal processing period and performing the first output in a writing period;

FIG. 23B is a time chart illustrating an example of an aspect of performing the second output in an A/D conversion period and performing the first output in the writing period;

DETAILED DESCRIPTION

Hereinafter, an example of embodiments of an imaging apparatus according to the embodiments of the technology of the present disclosure will be described in accordance with the appended drawings.

First, words used in the following description will be described.

The abbreviation CPU stands for "Central Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory".

The abbreviation LSI stands for "Large-Scale Integration". The abbreviation ASIC stands for "Application Specific Integrated Circuit". The abbreviation PLD stands for "Programmable Logic Device". The abbreviation FPGA stands for "Field-Programmable Gate Array".

The abbreviation SSD stands for "Solid State Drive". The abbreviation DVD-ROM stands for "Digital Versatile Disc Read Only Memory". The abbreviation USB stands for "Universal Serial Bus". The abbreviation HDD stands for "Hard Disk Drive". The abbreviation EEPROM stands for "Electrically Erasable and Programmable Read Only Memory".

The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation OF stands for "Interface". The abbreviation UI stands for "User Interface".

The abbreviation LVDS stands for "Low Voltage Differential Signaling". The abbreviation PCI-e stands for "Peripheral Component Interconnect Express". The abbreviation SATA stands for "Serial Advanced Technology Attachment". The abbreviation SLVS-EC stands for "Scalable Low Signaling with Embedded Clock". The abbreviation MIPI stands for "Mobile Industry Processor Interface".

First Embodiment

Figure 1:
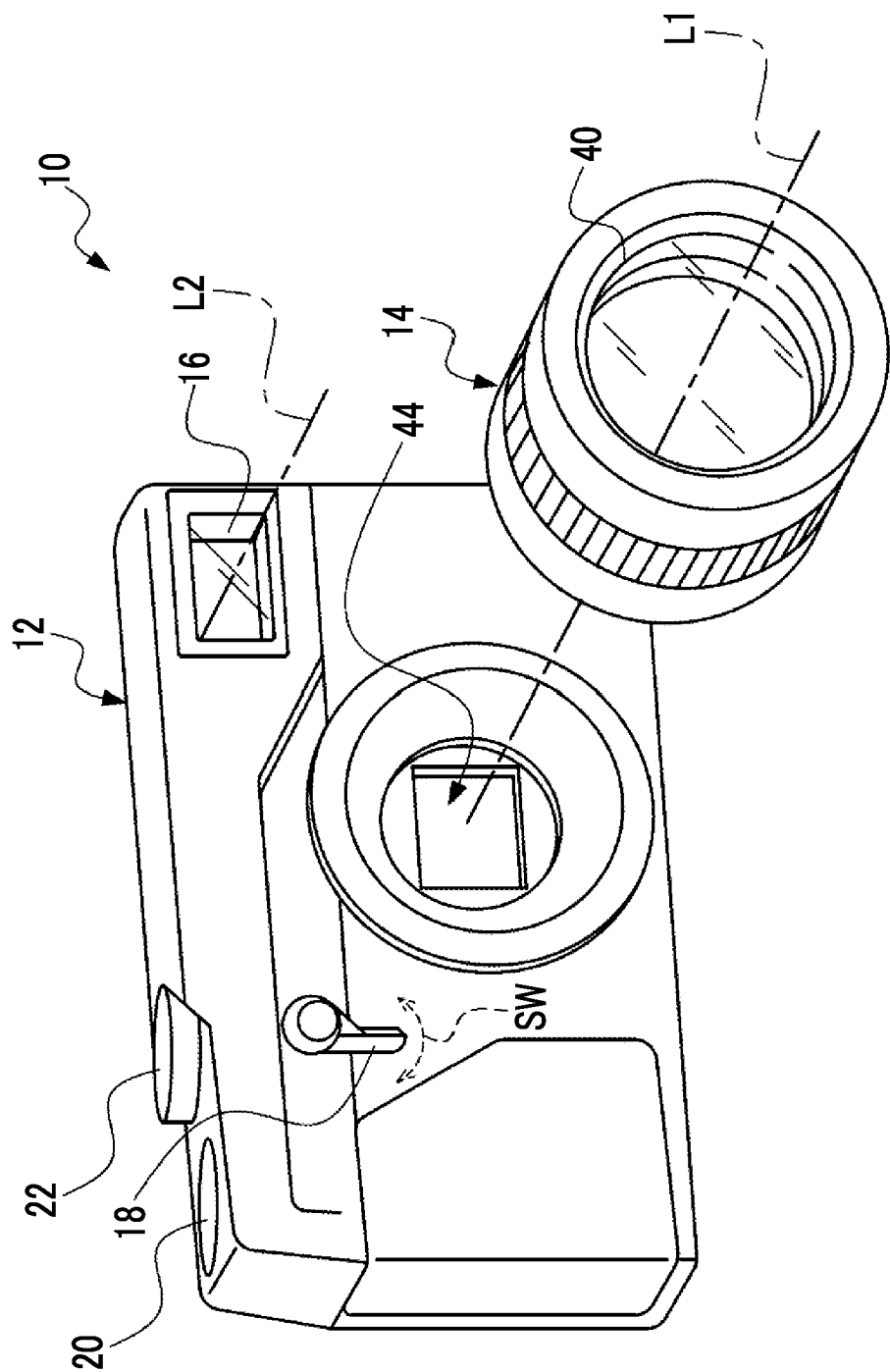
FIG. 1 is a perspective view illustrating an example of an exterior of an imaging apparatus according to first to third embodiments.

As illustrated in FIG. 1 as an example, an imaging apparatus 10 is an interchangeable lens camera. The imaging apparatus 10 is a digital camera that includes an imaging apparatus main body 12 and an interchangeable lens 14 interchangeably mounted on the imaging apparatus main body 12, and that does not include a reflex mirror.

An imaging element 44 is disposed in the imaging apparatus main body 12. In a case where the interchangeable lens 14 is mounted on the imaging apparatus main body 12, subject light that shows a subject is transmitted through the interchangeable lens 14, and an image of the subject light is formed on the imaging element 44. Image data 69 (refer to FIG. 3 and FIG. 4) that indicates an image of the subject is generated by the imaging element 44.

A hybrid finder (registered trademark) 16 is disposed in the imaging apparatus main body 12. For example, the hybrid finder 16 here refers to a finder in which an optical view finder (hereinafter, referred to as the OVF) and an electronic view finder (hereinafter, referred to as the EVF) are selectively used. The abbreviation OVF stands for "optical view finder". In addition, the abbreviation EVF stands for "electronic view finder".

A finder switching lever 18 is disposed on a front surface of the imaging apparatus main body 12. An optical image visually recognizable by the OVF and a live view image that is an electronic image visually recognizable by the EVF are switched by rotationally moving the finder switching lever 18 in a direction of arrow SW. The "live view image" here refers to a motion picture image for displaying based on the image data 69 (refer to FIG. 3 and FIG. 4) obtained by imaging performed by the imaging element 44. The live view image is generally referred to as a live preview image. A release button 20 and a dial 22 are disposed on an upper surface of the imaging apparatus main body 12. The dial 22 is operated in a case of setting an operation mode of an imaging system, an operation mode of a playback system, and the like.

The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position.

In the imaging apparatus 10, an imaging mode and a playback mode are selectively set as an operation mode in accordance with an instruction of a user. The imaging mode is broadly divided into a display motion picture imaging mode and a recording imaging mode.

Figure 2:
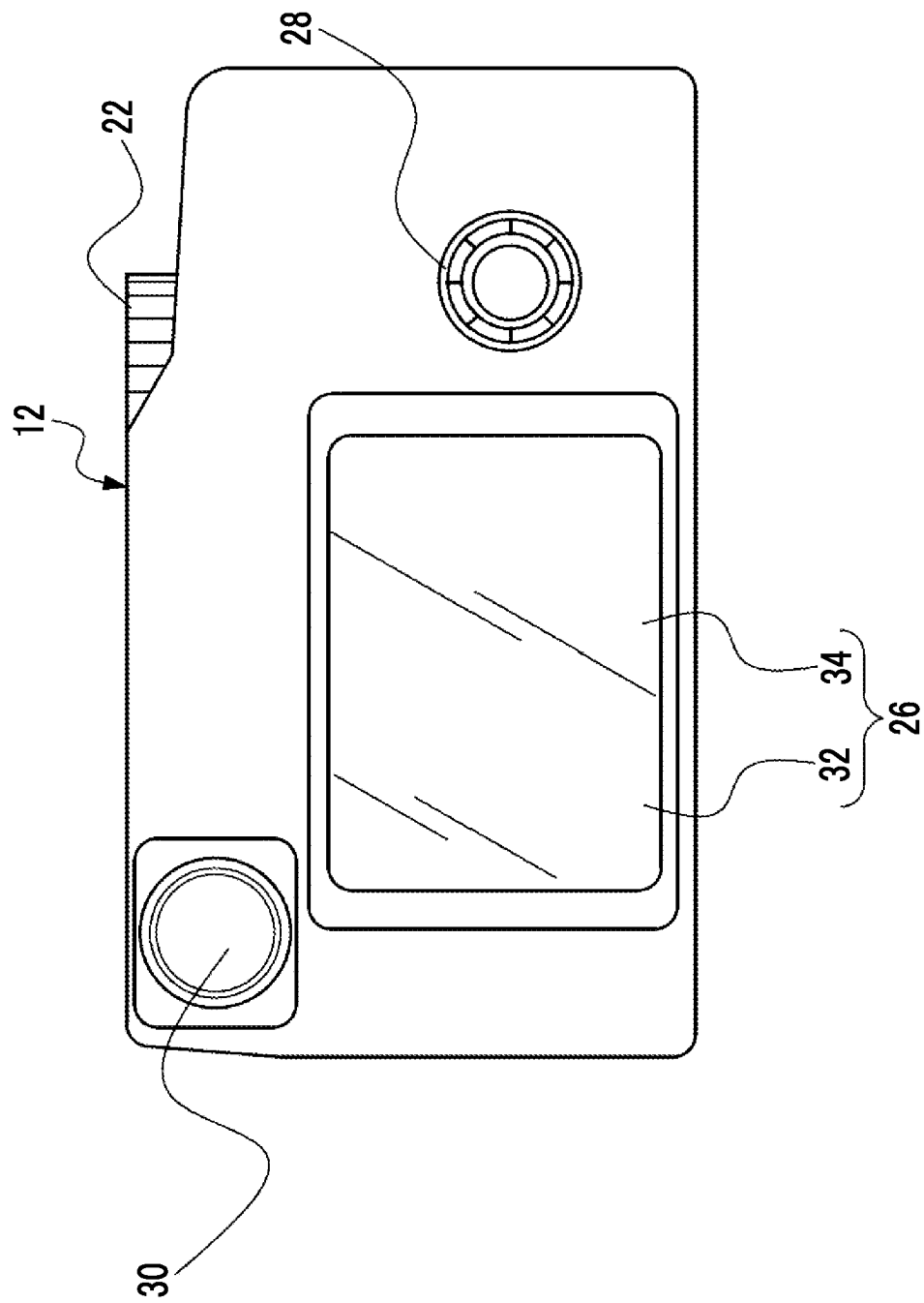
FIG. 2 is a rear view illustrating an example of the exterior on a rear surface side of the imaging apparatus illustrated in FIG. 1.

As illustrated in FIG. 2 as an example, a touch panel display 26, an instruction key 28, and a finder eyepiece portion 30 are disposed on a rear surface of the imaging apparatus main body 12.

Figure 5:
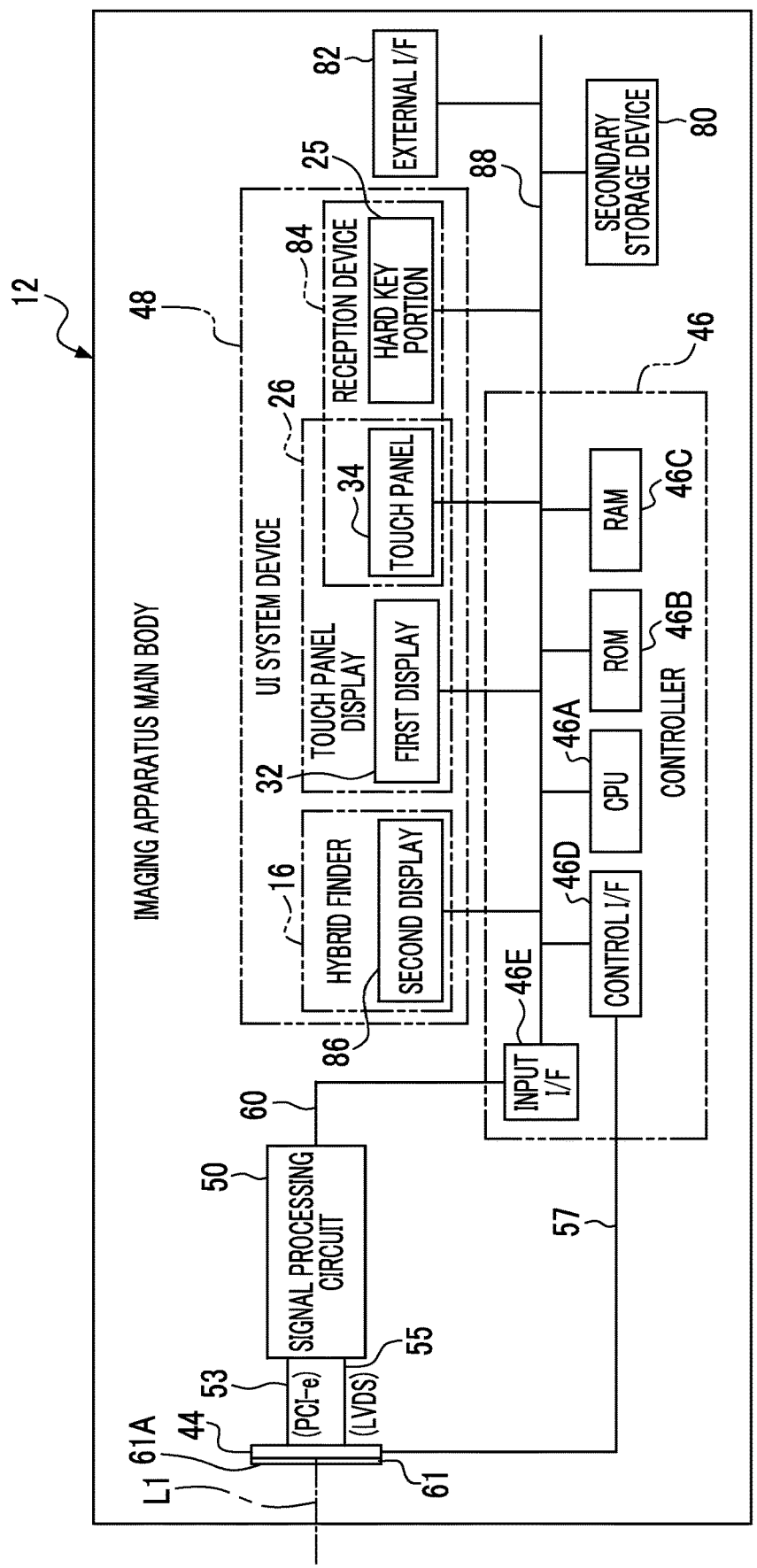
FIG. 5 is a block diagram illustrating an example of a configuration of an electric system of an imaging apparatus main body according to the first to third embodiments.

The touch panel display 26 comprises a first display 32 and a touch panel 34 (refer to FIG. 5). A liquid crystal display is exemplified as an example of the first display 32. The first display 32 may not be the liquid crystal display, and other displays such as an organic EL display may be used.

The first display 32 displays images, text information, and the like. The first display 32 is used for displaying the live view image obtained by consecutive imaging in a case where the imaging apparatus 10 is in the imaging mode. In addition, the first display 32 is used for displaying a still picture image obtained by imaging in a case where a still picture image capturing instruction is provided. Furthermore, the first display 32 is used for displaying a playback image and displaying a menu screen and the like in a case where the imaging apparatus 10 is in the playback mode.

The touch panel 34 is a transmissive touch panel and is overlaid on a surface of a display region of the first display 32. The touch panel 34 detects a contact of an instruction object such as a finger or a stylus pen.

The instruction key 28 receives various instructions such as selection of one or a plurality of menus, confirmation of a selected content, deletion of the selected content, zooming, and frame advance.

Figure 3:
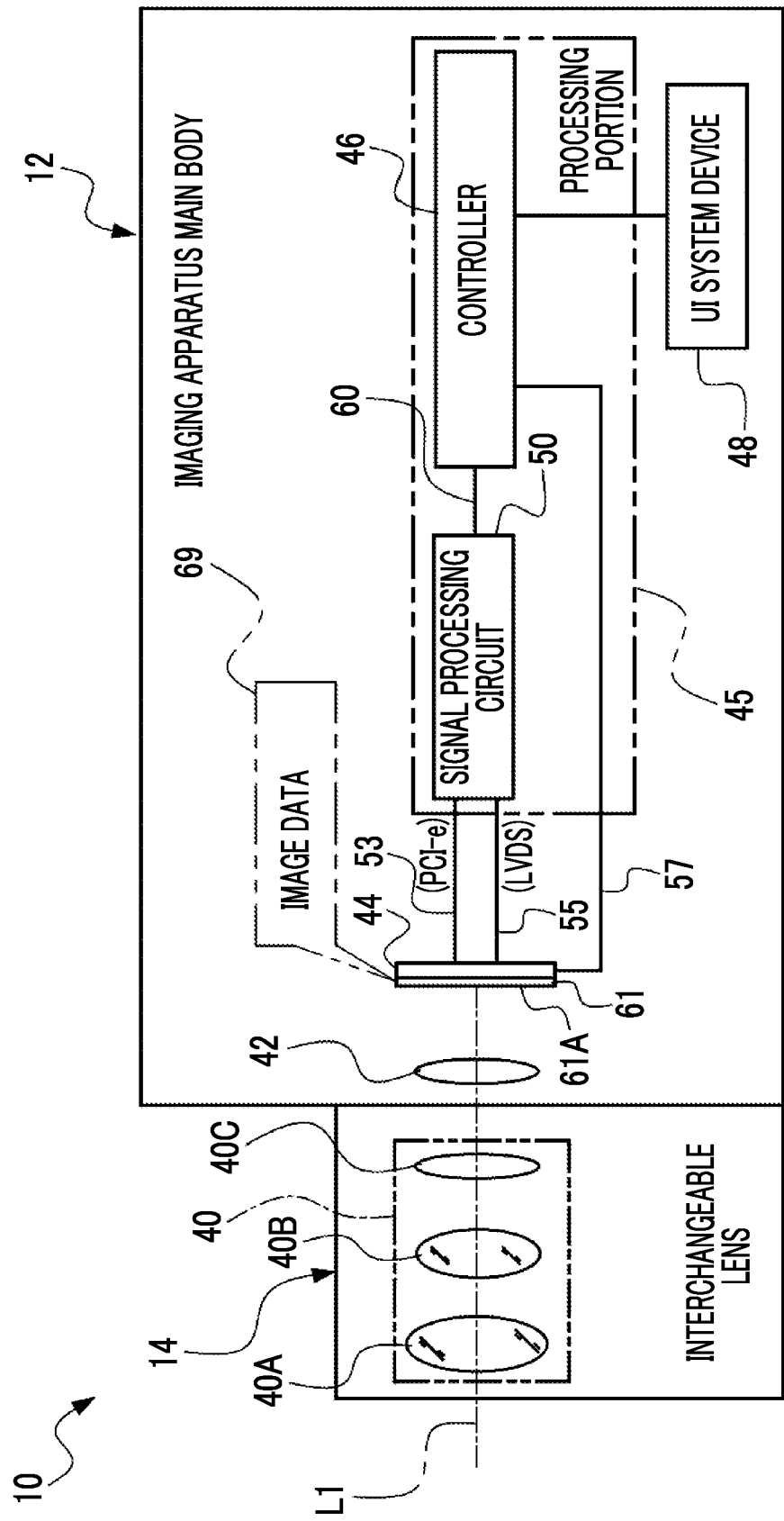
FIG. 3 is a block diagram illustrating an example of a configuration of the imaging apparatus according to the first to third embodiments.

As illustrated in FIG. 3 as an example, the interchangeable lens 14 includes an imaging lens 40. The imaging lens 40 comprises an objective lens 40A, a focus lens 40B, and a stop 40C. The objective lens 40A, the focus lens 40B, and the stop 40C are arranged in an order of the objective lens 40A, the focus lens 40B, and the stop 40C along an optical axis L1 from a subject side to an imaging apparatus main body 12 side. The focus lens 40B and the stop 40C operate by receiving motive power from a driving source (not illustrated) such as a motor. That is, the focus lens 40B and the stop 40C move along the optical axis L1 in response to the provided motive power. In addition, the stop 40C adjusts exposure by operating in response to the provided motive power.

The imaging apparatus main body 12 comprises a mechanical shutter 42, the imaging element 44, and a processing portion 45. The mechanical shutter 42 operates by receiving motive power from a driving source (not illustrated) such as a motor. The imaging element 44 comprises a photoelectric conversion element 61 having a light receiving surface 61A. In a case where the interchangeable lens 14 is mounted on the imaging apparatus main body 12, the subject light showing the subject is transmitted through the imaging lens 40, and the image of the subject light is formed on a light receiving surface 61A of the imaging element 44 through the mechanical shutter 42. The photoelectric conversion element 61 generates the image data 69 indicating the image of the subject by photoelectrically converting the subject light of which the image is formed on the light receiving surface 61A. The imaging element 44 digitizes the image data 69 generated by the photoelectric conversion element 61 and then, outputs the image data 69 to the processing portion 45 through each of communication lines 53 and 55.

The imaging apparatus main body 12 comprises the processing portion 45 and a UI system device 48. The processing portion 45 is an external processor that is arranged on an outside of the imaging element 44. The processing portion 45 is an example of a "processing portion on an outside of an imaging element" according to the embodiments of the technology of the present disclosure. The processing portion 45 is an electric circuit positioned in a rear stage of the imaging element 44 and comprises a controller 46 and a signal processing circuit 50.

The controller 46 controls the entire imaging apparatus 10. The UI system device 48 is a device that presents information to the user or receives an instruction from the user. The UI system device 48 is connected to the controller 46. The controller 46 acquires various types of information from the UI system device 48 and controls the UI system device 48.

The imaging element 44 is connected to the controller 46 through a communication line 57 and generates the image data 69 by imaging the subject under control of the controller 46.

The imaging element 44 is connected to the signal processing circuit 50 through the communication line 53 and the communication line 55. Specifically, the imaging element 44 and the signal processing circuit 50 are connected in parallel through the communication line 53 and the communication line 55. The imaging element 44 and the signal processing circuit are connected in accordance with a PCI-e connection standard through the communication line 53, and are connected in accordance with an LVDS connection standard through the communication line 55.

While PCI-e and LVDS are illustrated as the connection standards here, the technology of the present disclosure is not limited thereto, and other connection standards may be used. For example, SATA, SLVS-EC, and MIPI are exemplified as the other connection standards. However, these connection standards are merely an example, and connection standards with which communication through the communication line 53 and communication through the communication line 55 can be performed independently of each other between the imaging element 44 and the signal processing circuit 50 may be used.

In addition, while an example of a form of performing wired communication between the imaging element 44 and the signal processing circuit 50 using the communication line 53 and the communication line 55 is exemplified here, the technology of the present disclosure is not limited thereto. For example, instead of wired communication between the imaging element 44 and the signal processing circuit 50 through each of the communication line 53 and the communication line 55, wireless communication may be performed between the imaging element 44 and the signal processing circuit 50. In this case, a first wireless communication path corresponding to a wired communication path through the communication line 53 and a second wireless communication path corresponding to a wired communication path through the communication line 55 may be secured. The first communication path and the second communication path are wireless communication paths that have different communication standards and enable wireless communication in non-interfering frequency bandwidths. In addition, communication between the imaging element 44 and the signal processing circuit 50 may be performed through two communication paths of a wired communication path and a wireless communication path independently of each other.

The signal processing circuit 50 is an LSI, specifically, a device including an ASIC. The controller 46 is connected to the signal processing circuit 50 through a communication line 60. The controller 46 acquires various types of information from the signal processing circuit 50 and controls the signal processing circuit 50.

The image data 69 is input into the signal processing circuit 50 from the imaging element 44 through the communication lines 53 and 55. As will be described in detail later, the signal processing circuit 50 performs various types of signal processing on the image data 69 which is input through the communication lines 53 and 55.

In the present embodiment, the device including the ASIC is employed as the signal processing circuit 50. However, this is merely an example, and the signal processing circuit 50 may be a device including an ASIC, an FPGA, and/or a PLD. In addition, the signal processing circuit 50 may be a computer including a CPU, a ROM, and a RAM. The number of CPUs may be singular or plural. In addition, the signal processing circuit 50 may be implemented by a combination of a hardware configuration and a software configuration.

The imaging element 44 is an example of a "laminated imaging element" according to the embodiments of the technology of the present disclosure. In the present embodiment, the imaging element 44 is a CMOS image sensor. In addition, while the CMOS image sensor is illustrated here as the imaging element 44, the technology of the present disclosure is not limited thereto. For example, the technology of the present disclosure is also established in a case where the imaging element 44 is a CCD image sensor.

Figure 4:
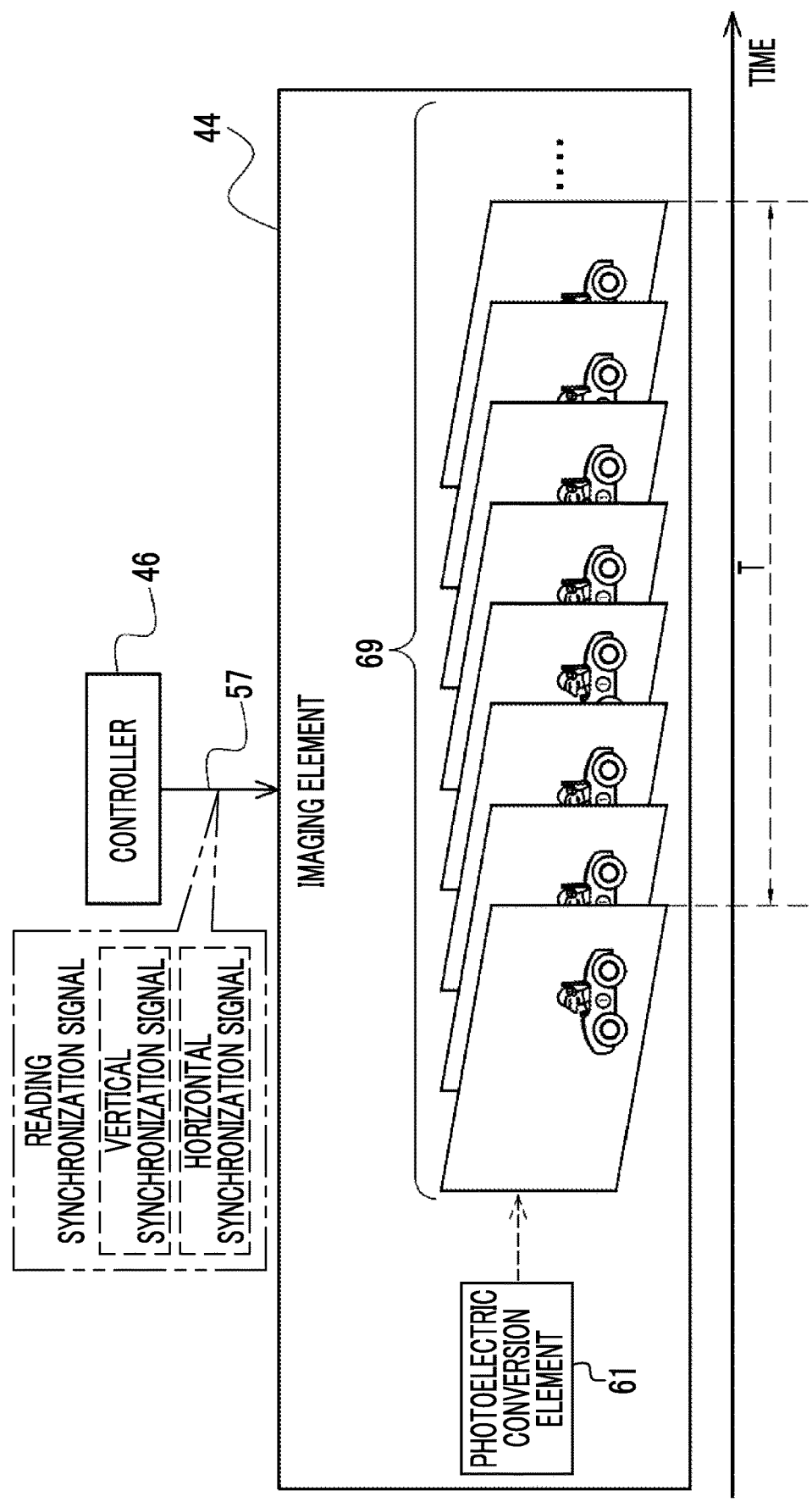
FIG. 4 is a conceptual diagram for describing a frame rate of an imaging element included in the imaging apparatus according to the first to third embodiments.

As illustrated in FIG. 4 as an example, a reading synchronization signal is input into the imaging element 44 from the controller 46 through the communication line 57. The reading synchronization signal includes a vertical synchronization signal and a horizontal synchronization signal. The vertical synchronization signal is a synchronization signal for defining a start timing of reading of the image data 69 for each frame from the photoelectric conversion element 61. The horizontal synchronization signal is a synchronization signal for defining a start timing of reading of the image data 69 for each horizontal line from the photoelectric conversion element 61. In the imaging element 44, the image data 69 is read out from the photoelectric conversion element 61 in accordance with a frame rate that is decided depending on the vertical synchronization signal input from the controller 46 through the communication line 57.

In the example illustrated in FIG. 4, a frame rate at which eight frames are read out from the photoelectric conversion element 61 within a period T is illustrated as a frame rate of the imaging element 44. As a specific example of the frame rate, 120 frames per second (fps) is exemplified.

As illustrated in FIG. 5 as an example, the controller 46 comprises a CPU 46A, a ROM 46B, a RAM 46C, a connection I/F 46D, and an input I/F 46E. The CPU 46A, the ROM 46B, the RAM 46C, the connection I/F 46D, and the input I/F 46E are connected to each other through a busline 88.

The ROM 46B stores various programs. The CPU 46A reads out the various programs from the ROM 46B and loads the read various programs into the RAM 46C. The CPU 46A controls the entire imaging apparatus 10 in accordance with the various programs loaded in the RAM 46C.

The connection I/F 46D is a communication device including an FPGA and is connected to the imaging element 44 through the communication line 57. The CPU 46A controls the imaging element 44 through the connection I/F 46D.

The input I/F 46E is a communication device including an FPGA and is connected to the signal processing circuit 50 through the communication line 60. The image data 69 (refer to FIG. 3 and FIG. 4) on which the various types of signal processing are performed by the signal processing circuit 50 is input into the input I/F 46E through the communication line 60. The input I/F 46E transfers the image data 69 input from the signal processing circuit 50 to the CPU 46A.

A secondary storage device 80 and an external I/F 82 are connected to the busline 88. The secondary storage device 80 is a non-volatile memory such as an SSD, an HDD, or an EEPROM. The CPU 46A reads out and writes various types of information in the secondary storage device 80. The secondary storage device 80 is an example of a "storage device" according to the embodiments of the technology of the present disclosure.

The external I/F 82 is a communication device including an FPGA. An external apparatus (not illustrated) such as a USB memory and a memory card is connected to the external I/F 82. The external I/F 82 exchanges various types of information between the CPU 46A and the external apparatus. The external apparatus such as a USB memory and a memory card is an example of the "storage device" according to the embodiments of the technology of the present disclosure.

The UI system device 48 comprises the hybrid finder 16, the touch panel display 26, and a reception device 84. The first display 32 and the touch panel 34 are connected to the busline 88. Accordingly, the CPU 46A displays various types of information on the first display 32 and operates in accordance with various instructions received by the touch panel 34.

The reception device 84 comprises the touch panel 34 and a hard key portion 25. The hard key portion 25 includes a plurality of hard keys of a release button 20, a dial 22, and an instruction key 28. The hard key portion 25 is connected to the busline 88, and the CPU 46A operates in accordance with various instructions received by the hard key portion 25.

The hybrid finder 16 comprises a second display 86. The CPU 46A displays various types of information on the second display 86. A liquid crystal display is exemplified as an example of the second display 86. The second display 86 may not be the liquid crystal display, and other displays such as an organic EL display may be used.

Figure 6:
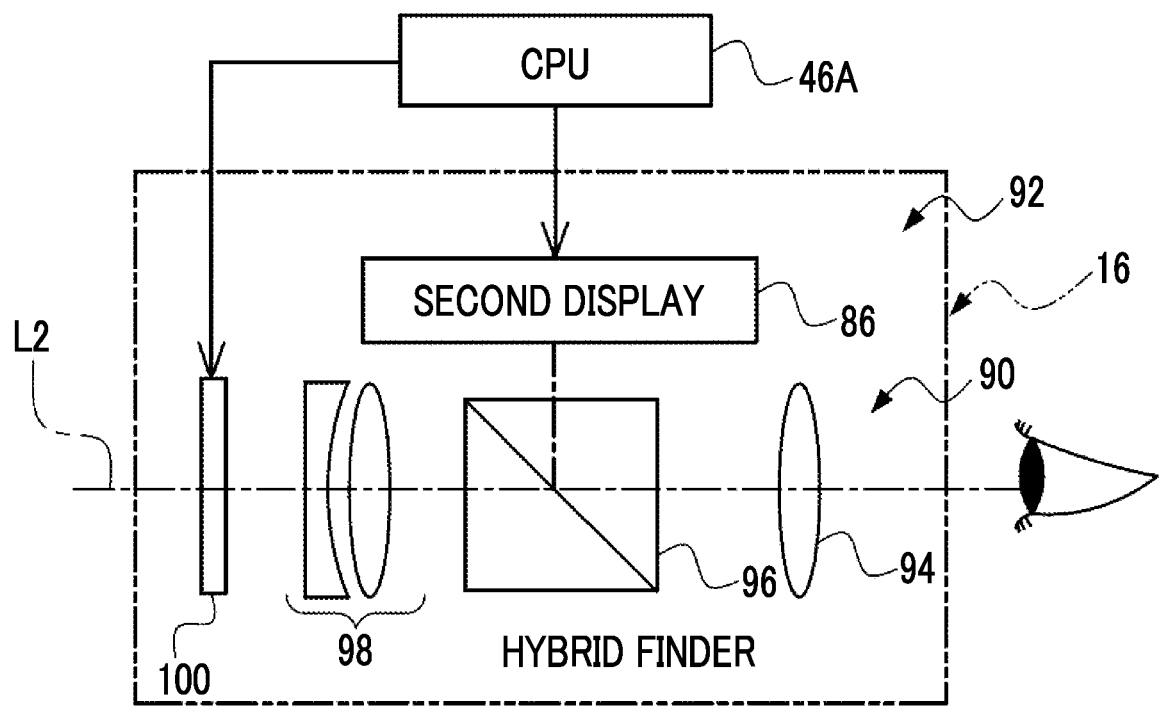
FIG. 6 is a schematic configuration diagram illustrating a configuration of a hybrid finder included in the imaging apparatus according to the first to third embodiments.

As illustrated in FIG. 6 as an example, the hybrid finder 16 includes an OVF 90 and an EVF 92. The OVF 90 is a reverse Galilean finder and includes an eyepiece lens 94, a prism 96, and an objective lens 98. The EVF 92 includes the second display 86, the prism 96, and the eyepiece lens 94.

A liquid crystal shutter 100 is arranged closer to the subject side than the objective lens 98 along an optical axis L2 of the objective lens 98. The liquid crystal shutter 100 blocks light such that the optical image is not incident on the objective lens 98 in a case of using the EVF 92.

The prism 96 reflects and guides the electronic image or various types of information displayed on the second display 86 to the eyepiece lens 94 and combines the optical image with the electronic image and/or the various types of information displayed on the second display 86. A live view image 102 based on the image data 69 is exemplified as the electronic image displayed on the second display 86.

In a case of an OVF mode, the CPU 46A enables the optical image to be visually recognized from the eyepiece lens 94 by controlling the liquid crystal shutter 100 to a non-light blocking state. In addition, in a case of an EVF mode, the CPU 46A enables only the electronic image displayed on the second display 86 to be visually recognized from the eyepiece lens 94 by controlling the liquid crystal shutter 100 to a light blocking state.

Hereinafter, for convenience of description, the first display 32 (refer to FIG. 2 and FIG. 5) and the second display 86 will be referred to as the "display" without a reference sign unless otherwise necessary to distinguish therebetween. The display is an example of a "display portion (display)" according to the embodiments of the technology of the present disclosure. In addition, the CPU 46A is an example of a "display control portion (display processor)" and a "storage control portion (storage processor)" according to the embodiments of the technology of the present disclosure.

Figure 7:
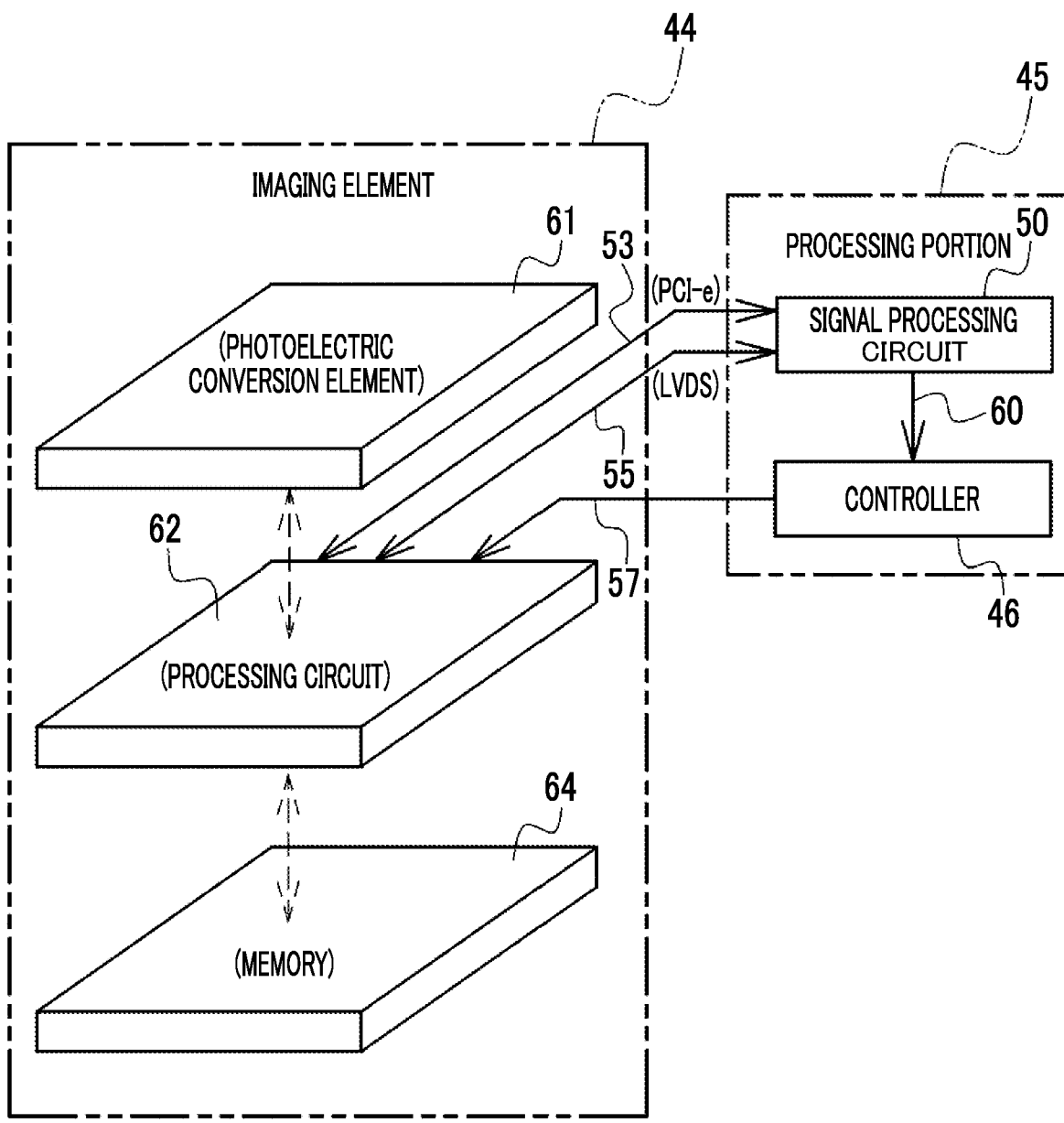
FIG. 7 is a block diagram illustrating an example of a laminated structure of the imaging element included in the imaging apparatus according to the first to third embodiments, and an example of a connection relationship among the imaging element, a signal processing circuit, and a controller.

As illustrated in FIG. 7 as an example, the imaging element 44 incorporates a photoelectric conversion element 61, a processing circuit 62, and a memory 64. The imaging element 44 is an imaging element in which the photoelectric conversion element 61, the processing circuit 62, and the memory 64 are formed in one chip. That is, the photoelectric conversion element 61, the processing circuit 62, and the memory 64 are formed in one package. In the imaging element 44, the photoelectric conversion element 61 is laminated with the processing circuit 62 and the memory 64. Specifically, the photoelectric conversion element 61 and the processing circuit 62 are electrically connected to each other by a bump (not illustrated) of copper or the like having conductivity. The processing circuit 62 and the memory 64 are also electrically connected to each other by a bump (not illustrated) of copper or the like having conductivity. While a three-layer structure of the photoelectric conversion element 61, the processing circuit 62, and the memory 64 is illustrated here, the technology of the present disclosure is not limited thereto. A two-layer structure of the photoelectric conversion element 61 and a memory layer in which the processing circuit 62 and the memory 64 are formed in one layer may be used. The memory 64 is an example of a "storage portion (memory)" according to the embodiments of the technology of the present disclosure.

For example, the processing circuit 62 is an LSI. The memory 64 is a memory of which a writing timing and a reading timing are different. Here, a DRAM is employed as an example of the memory 64. However, the technology of the present disclosure is not limited thereto, and an SRAM may be employed as the memory 64 instead of the DRAM.

The processing circuit 62 is a device including an ASIC and an FPGA and controls the entire imaging element 44 in accordance with an instruction of the controller 46. While an example of implementing the processing circuit 62 by the device including the ASIC and the FPGA is exemplified here, the technology of the present disclosure is not limited thereto. For example, a device including an ASIC, an FPGA, and/or a PLD may be used. In addition, a computer including a CPU, a ROM, and a RAM may be employed as the processing circuit 62. The number of CPUs may be singular or plural. In addition, the processing circuit 62 may be implemented by a combination of a hardware configuration and a software configuration.

The photoelectric conversion element 61 includes a plurality of photodiodes arranged in a matrix form. Photodiodes of "4896×3265" pixels are illustrated as an example of the plurality of photodiodes.

Color filters are arranged in each photodiode included in the photoelectric conversion element 61. The color filters include a G filter corresponding to green (G) that most contributes to obtaining a brightness signal, an R filter corresponding to red (R), and a B filter corresponding to blue (B). The photoelectric conversion element 61 includes R pixels, G pixels, and B pixels.

The R pixels are pixels corresponding to photodiodes in which the R filter is arranged. The G pixels are pixels corresponding to photodiodes in which the G filter is arranged. The B pixels are pixels corresponding to photodiodes in which the B filter is arranged. The R pixels, the G pixels, and the B pixels are arranged with predetermined periodicity in each of a row direction (horizontal direction) and a column direction (vertical direction). In the present embodiment, the R pixels, the G pixels, and the B pixels are arranged with periodicity corresponding to X-Trans (registered trademark) arrangement. While the X-Trans arrangement is illustrated here, the technology of the present disclosure is not limited thereto. Arrangement of the R pixels, the G pixels, and the B pixels may be Bayer arrangement or honeycomb arrangement.

The imaging element 44 has a so-called electronic shutter function and controls an electric charge accumulation time period of each photodiode in the photoelectric conversion element 61 by performing the electronic shutter function under control of the controller 46. The electric charge accumulation time period refers to a so-called shutter speed.

In the imaging apparatus 10, imaging for the still picture image and imaging for the motion picture image are performed using a rolling shutter method. The imaging for the still picture image is implemented by performing the electronic shutter function and operating the mechanical shutter 42 (refer to FIG. 3). The imaging for the motion picture image is implemented by performing the electronic shutter function without operating the mechanical shutter 42. While the rolling shutter method is illustrated here, the technology of the present disclosure is not limited thereto. A global shutter method may be applied instead of the rolling shutter method.

The processing circuit 62 reads out the image data 69 (refer to FIG. 3 and FIG. 4) obtained by imaging the subject by the photoelectric conversion element 61. The image data 69 is signal electric charges accumulated in the photoelectric conversion element 61. The processing circuit 62 performs A/D conversion on the analog image data 69 read out from the photoelectric conversion element 61. The processing circuit 62 stores the digital image data 69 obtained by performing the A/D conversion on the analog image data 69 in the memory 64.

The processing circuit 62 is connected to the signal processing circuit 50 through the communication line 53 and the communication line 55. In addition, the processing circuit 62 is connected to the controller 46 through the communication line 57.

The processing circuit 62 and the signal processing circuit 50 communicate in accordance with the PCI-e connection standard through the communication line 53, and communicate in accordance with the LVDS connection standard through the communication line 55.

Figure 8:
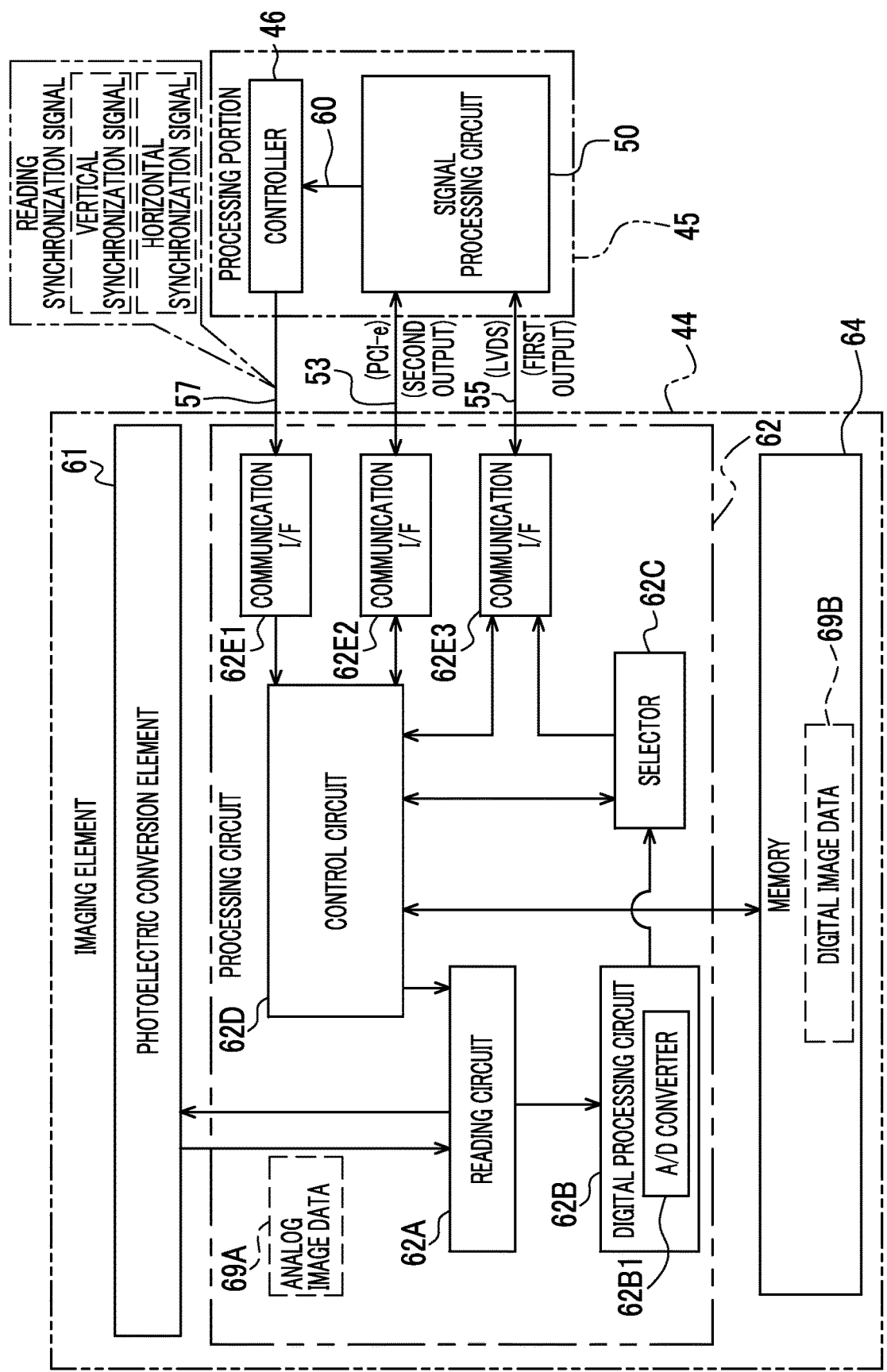
FIG. 8 is a block diagram illustrating an example of a configuration of an electric system of the imaging element included in the imaging apparatus according to the first embodiment.

As illustrated in FIG. 8 as an example, the processing circuit 62 is an example of a "processor" according to the embodiments of the technology of the present disclosure. A reading circuit 62A, a digital processing circuit 62B, a selector 62C, a control circuit 62D, and communication I/Fs 62E1, 62E2, and 62E3 are comprised. The communication I/F 62E2 is an example of a "second output portion (second communication interface)" according to the embodiments of the technology of the present disclosure. The communication I/F 62E3 is an example of a "first output portion (first communication interface)" according to the embodiments of the technology of the present disclosure. In addition, the control circuit 62D is an example of a "memory controller" according to the embodiments of the technology of the present disclosure.

The reading circuit 62A is connected to each of the photoelectric conversion element 61, the digital processing circuit 62B, and the control circuit 62D. The memory 64 is connected to the control circuit 62D. The selector 62C is connected to each of the digital processing circuit 62B, the control circuit 62D, and the communication I/F 62E3. Each of the communication I/Fs 62E1, 62E2, and 62E3 is connected to the control circuit 62D.

As illustrated in FIG. 8 as an example, the image data 69 is broadly divided into analog image data 69A and digital image data 69B. Hereinafter, for convenience of description, the analog image data 69A and the digital image data 69B will be referred to as the "image data 69" unless otherwise necessary to distinguish therebetween.

The communication I/F 62E1 is a communication device including an FPGA and is connected to the controller 46 through the communication line 57. The controller 46 outputs the reading synchronization signal to the communication I/F 62E1 through the communication line 57. The communication I/F 62E1 receives the reading synchronization signal from the controller 46 through the communication line 57 and outputs the received reading synchronization signal to the control circuit 62D.

The communication I/F 62E2 is a communication device including an FPGA and is connected to the signal processing circuit 50 in accordance with the PCI-e connection standard through the communication line 53. The communication I/F 62E2 controls communication between the signal processing circuit 50 and the control circuit 62D. Here, the communication device including the FPGA is employed as the communication I/F 62E2 but is merely an example. The communication I/F 62E2 may be a device including an ASIC, an FPGA, and/or a PLD. In addition, the communication I/F 62E2 may be a computer including a CPU, a ROM, and a RAM. The number of CPUs may be singular or plural. In addition, the communication I/F 62E2 may be implemented by a combination of a hardware configuration and a software configuration.

The communication I/F 62E3 is a communication device including an FPGA and is connected to the signal processing circuit 50 in accordance with the LVDS connection standard through the communication line 55. The communication I/F 62E2 controls communication between the signal processing circuit 50 and the selector 62C and communication between the signal processing circuit 50 and the control circuit 62D. Here, the communication device including the FPGA is employed as the communication I/F 62E3 but is merely an example. The communication I/F 62E3 may be a device including an ASIC, an FPGA, and/or a PLD. In addition, the communication I/F 62E3 may be a computer including a CPU, a ROM, and a RAM. The number of CPUs may be singular or plural. In addition, the communication I/F 62E3 may be implemented by a combination of a hardware configuration and a software configuration.

The reading circuit 62A controls the photoelectric conversion element 61 and reads out the analog image data 69A from the photoelectric conversion element 61 under control of the control circuit 62D. Reading of the analog image data 69A from the photoelectric conversion element 61 is performed in accordance with the reading synchronization signal which is input into the processing circuit 62 from the controller 46.

Specifically, first, the communication I/F 62E1 receives the reading synchronization signal from the controller 46 and outputs the received reading synchronization signal to the control circuit 62D. Next, the control circuit 62D transfers the reading synchronization signal input from the communication I/F 62E1 to the reading circuit 62A. That is, the vertical synchronization signal and the horizontal synchronization signal are transferred to the reading circuit 62A. The reading circuit 62A starts reading out the analog image data 69A in units of frames from the photoelectric conversion element 61 in accordance with the vertical synchronization signal transferred from the control circuit 62D. In addition, the reading circuit 62A starts reading out the analog image data 69A in units of horizontal lines in accordance with the horizontal synchronization signal transferred from the control circuit 62D.

The reading circuit 62A performs analog signal processing on the analog image data 69A read out from the photoelectric conversion element 61. The analog signal processing includes well-known processing such as noise cancelation processing and analog gain processing. The noise cancelation processing is processing of canceling a noise caused by variations in characteristics between pixels included in the photoelectric conversion element 61. The analog gain processing is processing of applying a gain to the analog image data 69A. The analog image data 69A on which the analog signal processing is performed in such a manner is output to the digital processing circuit 62B by the reading circuit 62A.

The digital processing circuit 62B comprises an A/D converter 62B1. The A/D converter 62B1 performs the A/D conversion on the analog image data 69A. The A/D converter 62B1 is an example of a "first A/D converter" and a "second A/D converter" according to the embodiments of the technology of the present disclosure.

The digital processing circuit 62B performs digital signal processing on the analog image data 69A input from the reading circuit 62A. For example, the digital signal processing includes correlative double sampling, the A/D conversion performed by the A/D converter 62B1, and digital gain processing.

The correlative double sampling is performed on the analog image data 69A by the digital processing circuit 62B. The A/D converter 62B1 performs the A/D conversion on the analog image data 69A on which signal processing of the correlative double sampling is performed. Accordingly, the analog image data 69A is digitized, and the digital image data 69B is obtained as the RAW data. The digital gain processing is performed on the digital image data 69B by the digital processing circuit 62B. The digital gain processing refers to processing of applying a gain to the digital image data 69B. The digital image data 69B obtained by performing the digital signal processing in such a manner is output to the selector 62C by the digital processing circuit 62B.

The selector 62C selectively transfers the digital image data 69B input from the digital processing circuit 62B to two transfer destinations. That is, the selector 62C selectively transfers the digital image data 69B input from the digital processing circuit 62B to the control circuit 62D and the communication I/F 62E3 in accordance with an instruction of the control circuit 62D.

The control circuit 62D stores the digital image data 69B input from the selector 62C in the memory 64. The memory 64 is a memory that can store the digital image data 69B of a plurality of frames. The memory 64 has a storage region (not illustrated) in units of pixels. The digital image data 69B is stored in a corresponding storage region of the memory 64 in units of pixels by the control circuit 62D.

The control circuit 62D can randomly access the memory 64 and acquires the digital image data 69B from the memory 64 in response to a request from the signal processing circuit 50 through the communication I/F 62E2. The control circuit 62D outputs the digital image data 69B acquired from the memory 64 to the communication I/F 62E2.

In the processing circuit 62, as output of the digital image data 69B to the signal processing circuit 50, first output through the communication line 53 and second output through the communication line 55 are performed independently of each other under control of the control circuit 62D. The first output and the second output are output using output methods different from each other. That is, transfer paths of the digital image data 69B transferred until the digital image data 69B is output to the signal processing circuit 50 are different, and connection standards between the imaging element 44 and the signal processing circuit 50 are also different between the first output and the second output.

The first output refers to output of the digital image data 69B to the signal processing circuit 50 through a first transfer path. The first transfer path refers to a path through which the digital image data 69B is transferred in order of the selector 62C, the communication I/F 62E3, and the signal processing circuit 50 without passing through the control circuit 62D. That is, an output method of the first output is an output method of outputting the digital image data 69B obtained from the A/D converter 62B1 without storing the digital image data 69B in the memory 64. The digital image data 69B transferred through the first transfer path is an example of "first image data obtained by imaging a subject" according to the embodiments of the technology of the present disclosure.

The second output refers to output of the digital image data 69B to the signal processing circuit 50 through a second transfer path. The second transfer path refers to a path through which the digital image data 69B is transferred in order of the memory 64, the control circuit 62D, the communication OF 62E2, and the signal processing circuit 50. That is, an output method of the second output is an output method of outputting the digital image data 69B read out from the memory 64 by the control circuit 62D. The digital image data 69B transferred through the second transfer path is an example of "second image data based on image data stored in the storage portion" according to the embodiments of the technology of the present disclosure.

The first output is implemented using the communication OF 62E3 and the communication line 55. That is, in a case where the digital image data 69B is input from the selector 62C, the communication OF 62E3 outputs the input digital image data 69B to the signal processing circuit 50 through the communication line 55.

The second output is implemented using the communication OF 62E2 and the communication line 53. That is, in a case where the digital image data 69B is input from the control circuit 62D, the communication OF 62E2 outputs the input digital image data 69B to the signal processing circuit 50 through the communication line 53.

The signal processing circuit 50 performs the various types of signal processing on the digital image data 69B which is input from the processing circuit 62 through the communication lines 53 and 55. The various types of signal processing include well-known signal processing such as demosaicing, digital thinning processing, and digital addition processing.

The demosaicing is processing of calculating every color information for each pixel from a mosaic image corresponding to arrangement of the color filters. For example, in a case of an imaging element consisting of color filters of three colors of R, G, and B, color information on all of R, G, and B for each pixel from a mosaic image consisting of R, G, and B is calculated. The digital thinning processing is processing of thinning out pixels included in the digital image data 69B in units of lines. For example, the units of lines refer to units of horizontal lines and/or units of vertical lines. The digital addition processing is, for example, processing of calculating an arithmetic mean of pixel values for a plurality of pixels included in the digital image data 69B.

The various types of signal processing also include other well-known signal processing. For example, white balance adjustment, sharpness adjustment, gamma correction, color space conversion processing, and color difference correction are exemplified as the other well-known signal processing.

Figure 9:
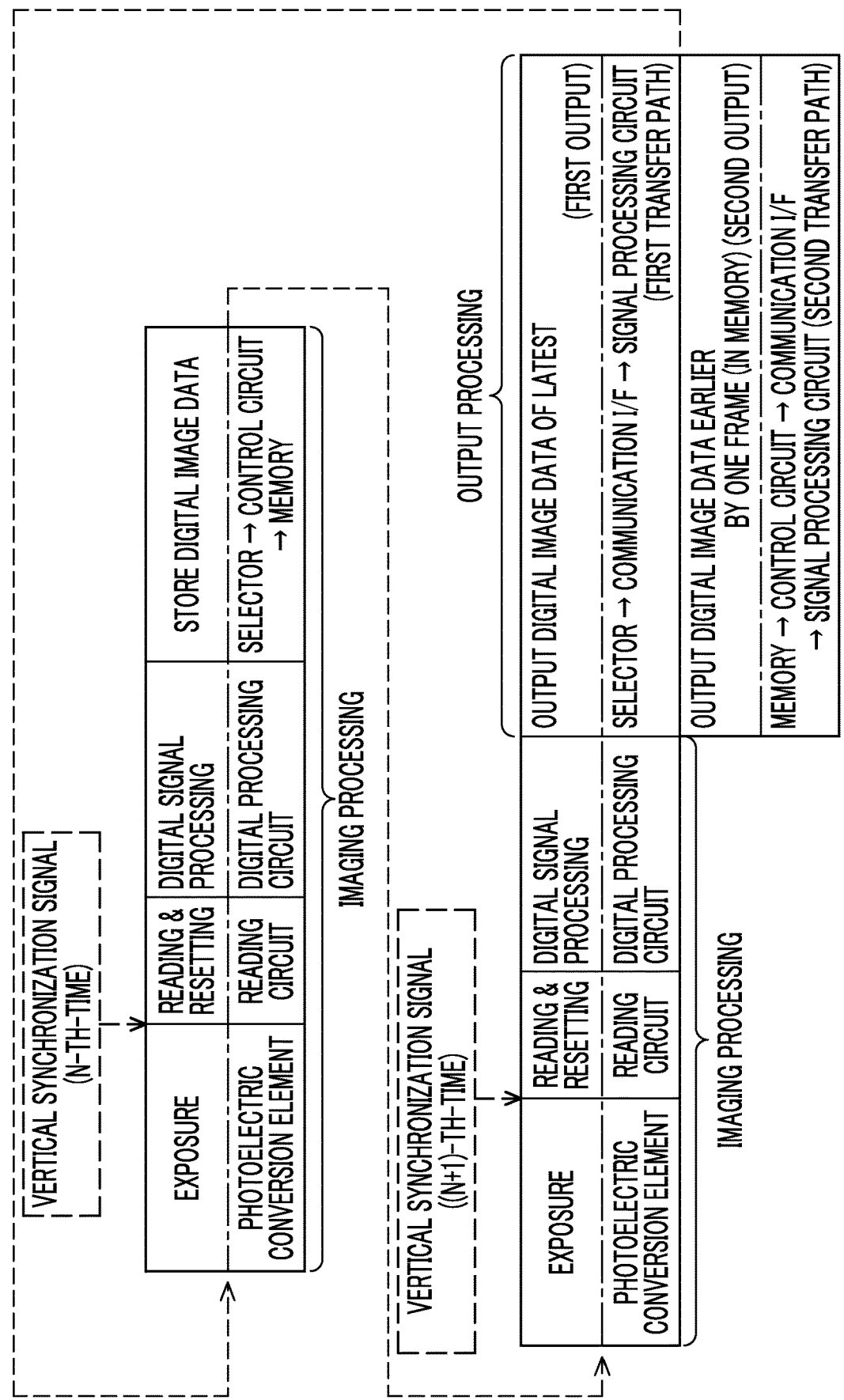
FIG. 9 is a state transition diagram illustrating an example of time-series processing contents of imaging processing and output processing performed by the imaging element included in the imaging apparatus according to the first embodiment.

As illustrated in FIG. 9 as an example, in the imaging element 44, processing including imaging processing and output processing is performed. In the imaging processing, N (natural number)-th-time exposure, N-th-time reading, N-th-time resetting, N-th-time digital signal processing, and N-th-time storage are performed, and then, N+1-th-time exposure, N+1-th-time reading, N+1-th-time resetting, and N+1-th-time digital signal processing are performed. After the output processing is performed, N is incremented by one, and the imaging processing and the output processing are repeated.

In a case where the imaging processing is started, the photoelectric conversion element 61 is reset by the reading circuit 62A, and residual electric charges of each pixel in the photoelectric conversion element 61 are removed. The N-th-time exposure is performed by the photoelectric conversion element 61 after previous resetting of the photoelectric conversion element 61 by the reading circuit 62A and before the N-th-time reading.

In a case where an N-th-time vertical synchronization signal is input into the reading circuit 62A, the N-th-time reading is performed by the reading circuit 62A. The N-th-time reading refers to reading of the analog image data 69A performed by the reading circuit 62A in accordance with input of the N-th-time vertical synchronization signal into the reading circuit 62A.

The N-th-time resetting refers to resetting of the photoelectric conversion element 61 performed by the reading circuit 62A in correspondence with the N-th-time reading. The N-th-time digital signal processing refers to digital signal processing performed by the digital processing circuit 62B on the analog image data 69A obtained by the N-th-time reading.

The N-th-time storage refers to storage of the digital image data 69B obtained by the N-th-time digital signal processing in the memory 64. The N-th-time storage is implemented using the selector 62C, the control circuit 62D, and the memory 64. That is, the digital image data 69B obtained by the N-th-time digital signal processing is input into the control circuit 62D through the selector 62C and stored in the memory 64 by the control circuit 62D.

The N+1-th-time exposure is performed by the photoelectric conversion element 61 after the N-th-time resetting and before the N+1-th-time reading.

In a case where an N+1-th-time vertical synchronization signal is input into the reading circuit 62A, the N+1-th-time reading is performed by the reading circuit 62A. The N+1-th-time reading refers to reading of the analog image data 69A performed by the reading circuit 62A in accordance with input of the N+1-th-time vertical synchronization signal into the reading circuit 62A.

The N+1-th-time resetting refers to resetting of the photoelectric conversion element 61 performed by the reading circuit 62A in correspondence with the N+1-th-time reading. The N+1-th-time digital signal processing refers to digital signal processing performed by the digital processing circuit 62B on the analog image data 69A obtained by the N+1-th-time reading.

In the output processing, the first output and the second output are performed in parallel. That is, the latest digital image data 69B is output to the signal processing circuit 50 through the first transfer path, and the digital image data 69B earlier by one frame is output to the signal processing circuit 50 through the second transfer path.

Here, the latest digital image data 69B refers to the digital image data 69B obtained by the N+1-th-time digital signal processing. In addition, the digital image data 69B earlier by one frame refers to the digital image data 69B stored in the memory 64 at a current point in time. The digital image data 69B stored in the memory 64 at the current point in time refers to the digital image data 69B that is obtained by the N-th-time digital signal processing, input into the control circuit 62D through the selector 62C, and stored in the memory 64 by the control circuit 62D.

Figure 10:
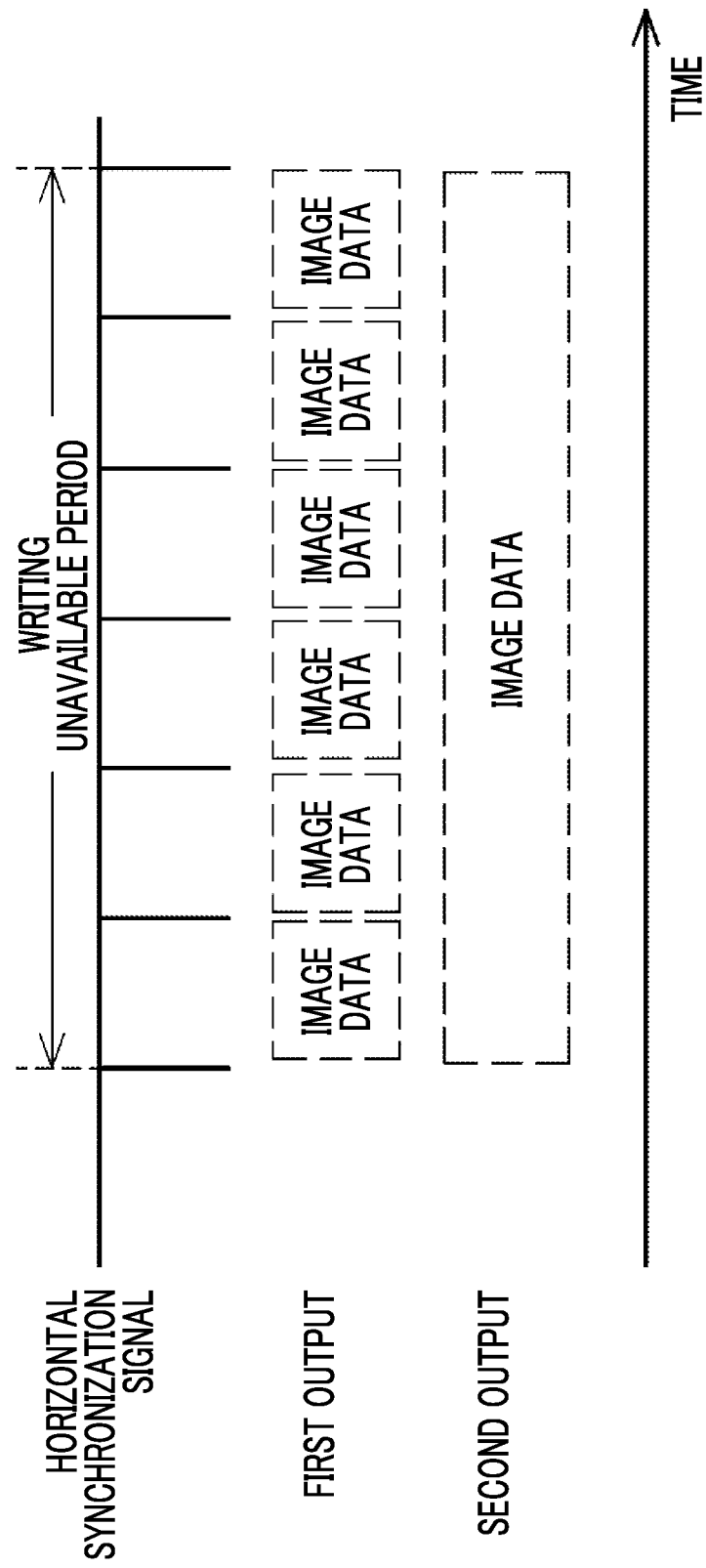
FIG. 10 is a time chart illustrating an example of an aspect of performing first output and second output in parallel.

In the imaging element 44, since the memory 64 is the DRAM, writing and reading cannot be performed at the same time in the memory 64. Thus, as illustrated in FIG. 10 as an example, the first output and the second output are performed in a period ("writing unavailable period" illustrated in FIG. 10) in which writing into the memory 64 is unavailable. In other words, in the imaging element 44, the digital image data of two consecutive frames is output to the signal processing circuit 50 in parallel using the writing unavailable period.

In the example illustrated in FIG. 10, the first output is performed in accordance with the horizontal synchronization signal which is input from the controller 46 through the communication OF 62E. That is, the communication OF 62E3 outputs the digital image data 69B input from the selector 62C (refer to FIG. 8) to the signal processing circuit 50 for each horizontal line in accordance with the horizontal synchronization signal which is input from the controller 46 through the communication OF 62E1 and the control circuit 62D.

Meanwhile, the second output is performed in parallel with the first output. That is, while the first output is performed, the control circuit 62D acquires, from the memory 64, the digital image data 69B of one frame that is obtained earlier by one frame than the digital image data 69B output from the communication OF 62E3, and outputs the acquired digital image data 69B to the communication OF 62E2. The communication OF 62E2 outputs the digital image data 69B of one frame input from the control circuit 62D to the signal processing circuit 50.

Next, an action of the imaging apparatus 10 will be described.

First, a flow of control processing executed by the processing circuit 62 of the imaging element 44 will be described with reference to FIG. 11.

Figure 11:
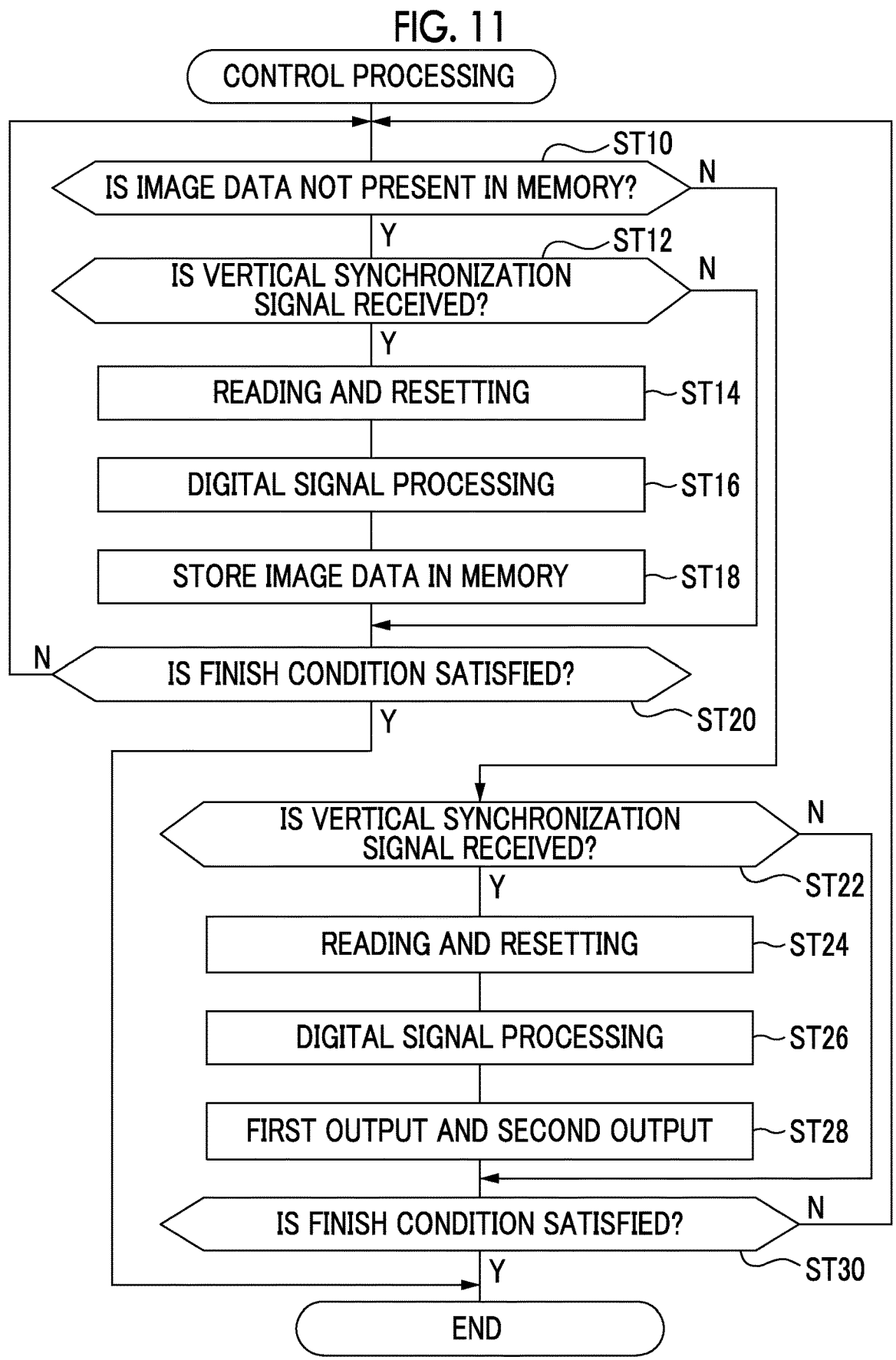
FIG. 11 is a flowchart illustrating an example of a flow of control processing according to the first embodiment.

In the control processing illustrated in FIG. 11, first, in step ST10, the control circuit 62D determines whether or not the digital image data 69B is not stored in the memory 64. In step ST10, in a case where the digital image data 69B is stored in the memory 64, a negative determination is made, and the control processing transitions to step ST22. In step ST10, in a case where the digital image data 69B is not stored in the memory 64, a positive determination is made, and the control processing transitions to step ST12.

In step ST12, the control circuit 62D determines whether or not the vertical synchronization signal from the controller 46 is received by the communication OF 62E1. In step ST12, in a case where the vertical synchronization signal from the controller 46 is not received by the communication OF 62E1, a negative determination is made, and the control processing transitions to step ST20. In step ST12, in a case where the vertical synchronization signal from the controller 46 is received by the communication OF 62E1, a positive determination is made, and the control processing transitions to step ST14.

In step ST14, the reading circuit 62A reads out the analog image data 69A and resets the photoelectric conversion element 61. Then, the control processing transitions to step ST16.

In step ST16, the digital processing circuit 62B performs the digital signal processing on the analog image data 69A. Then, the control processing transitions to step ST18.

The digital image data 69B obtained by performing the digital signal processing on the analog image data 69A in step ST16 is output to the selector 62C. The selector 62C transfers the digital image data 69B to the control circuit 62D.

In step ST18, the control circuit 62D stores the digital image data 69B in the memory 64. Then, the control processing transitions to step ST20.

In step ST20, the control circuit 62D determines whether or not a condition (hereinafter, referred to as a "control processing finish condition") under which the control processing is finished is satisfied. A condition that an instruction to finish the control processing is received by the reception device 84 (refer to FIG. 5) is exemplified as an example of the control processing finish condition. In step ST20, in a case where the control processing finish condition is not satisfied, a negative determination is made, and the control processing transitions to step ST10. In step ST20, in a case where the control processing finish condition is satisfied, a positive determination is made, and the control processing is finished.

In step ST22, the control circuit 62D determines whether or not the vertical synchronization signal from the controller 46 is received by the communication OF 62E1. In step ST22, in a case where the vertical synchronization signal from the controller 46 is not received by the communication OF 62E1, a negative determination is made, and the control processing transitions to step ST30. In step ST22, in a case where the vertical synchronization signal from the controller 46 is received by the communication OF 62E1, a positive determination is made, and the control processing transitions to step ST24.

In step ST24, the reading circuit 62A reads out the analog image data 69A and resets the photoelectric conversion element 61. Then, the control processing transitions to step ST26.

In step ST26, the digital processing circuit 62B performs the digital signal processing on the analog image data 69A. Then, the control processing transitions to step ST28.

The digital image data 69B obtained by performing the digital signal processing on the analog image data 69A in step ST26 is output to the selector 62C. The selector 62C transfers the digital image data 69B to the communication OF 62E3.

In step ST28, the processing circuit 62 performs the first output and the second output. Then, a transition is made to step ST30. The first output and the second output are output using the output methods different from each other. That is, the first output is output performed in accordance with the LVDS connection standard using the first transfer path (refer to FIG. 9), and the second output is output performed in accordance with the PCI-e connection standard using the second transfer path (refer to FIG. 9).

In step ST28, the communication OF 62E3 outputs the digital image data 69B transferred from the selector 62C to the signal processing circuit 50 through the communication line 55 (first output). Meanwhile, the control circuit 62D acquires the digital image data 69B earlier by one frame from the memory 64 in response to a request from the controller 46 and outputs the digital image data 69B to the signal processing circuit 50 from the communication OF 62E2 through the communication line 53 (second output).

In step ST30, the control circuit 62D determines whether or not the control processing finish condition is satisfied. In step ST30, in a case where the control processing finish condition is not satisfied, a negative determination is made, and the control processing transitions to step ST10. In step ST20, in a case where the control processing finish condition is satisfied, a positive determination is made, and the control processing is finished.

In a case where the digital image data 69B output to the signal processing circuit 50 from the communication I/F 62E3 through the communication line 55 by executing the control processing is input into the signal processing circuit 50, the digital image data 69B is transferred to the controller 46. Meanwhile, in a case where the digital image data 69B output to the signal processing circuit 50 from the communication I/F 62E2 through the communication line 53 is input into the signal processing circuit 50, the digital image data 69B is also transferred to the controller 46. In the controller 46, the digital image data 69B is input into the input I/F 46E, and an image based on the digital image data 69B is displayed on the display by the CPU 46A. The image based on the digital image data 69B input into the input I/F 46E is an example of a "first image based on the first image data" and a "second image based on the second image data" according to the embodiments of the technology of the present disclosure.

In addition, the digital image data 69B input into the input I/F 46E is stored in the secondary storage device 80 by the CPU 46A or stored in the external apparatus such as the USB memory (not illustrated) and/or the memory card (not illustrated) through the external I/F 82.

As described above, in the imaging apparatus 10, the digital image data 69B obtained by imaging the subject is output to the signal processing circuit 50 by the communication I/F 62E3. In addition, the digital image data 69B stored in the memory 64 is output to the signal processing circuit 50 by the communication I/F 62E2. An output method of the communication I/F 62E3 and an output method of the communication I/F 62E2 are different. That is, the latest digital image data 69B is output to the signal processing circuit 50 through the communication line 55 using the first transfer path (refer to FIG. 9), and the digital image data 69B earlier by one frame is output to the signal processing circuit 50 through the communication line 53 using the second transfer path (refer to FIG. 9). In addition, the communication I/F 62E3 and the signal processing circuit 50 are connected in accordance with the LVDS connection standard, and the communication I/F 62E2 and the signal processing circuit 50 are connected in accordance with the PCI-e connection standard. Accordingly, according to the imaging apparatus 10, a delay in output of the digital image data 69B can be suppressed, compared to a case where the digital image data 69B is output to the processing portion 45 from only a single communication I/F.

In addition, in the imaging apparatus 10, the first output and the second output (refer to FIG. 8 to FIG. 10) are performed independently of each other under control of the control circuit 62D. Accordingly, according to the imaging apparatus 10, a timing at which the first output is performed, and a timing at which the second output is performed can be freely changed.

In addition, in the imaging apparatus 10, the second output is performed in response to the request from the controller 46. Accordingly, according to the imaging apparatus 10, performing the second output regardless of the processing portion 45 not in a state of receiving the second output can be avoided.

In addition, in the imaging apparatus 10, the output method of outputting the digital image data 69B obtained from the A/D converter 62B1 without storing the digital image data 69B in the memory 64 is employed as the output method of the first output. In addition, the output method of outputting the digital image data 69B read out from the memory 64 by the control circuit 62D is employed as the output method of the second output. That is, even in a case where the second output cannot be performed, the first output is continuously performed. Accordingly, according to the imaging apparatus 10, even in a period in which the digital image data 69B is written into the memory 64, output from the imaging element 44 to the signal processing circuit 50 can be continued.

In addition, in the imaging apparatus 10, the memory of which the writing timing and the reading timing are different is employed as the memory 64. In the imaging apparatus 10, the first output and the second output are performed at a timing at which a writing timing for the memory 64 is avoided. Accordingly, according to the imaging apparatus 10, even in a case where the memory 64 is the memory of which the writing timing and the reading timing are different, output of the digital image data 69B from the imaging element 44 to the processing portion 45 can be continued.

In addition, in the imaging apparatus 10, the DRAM is employed as the memory 64. In the imaging apparatus 10, the first output and the second output are performed at a timing at which a writing timing for the DRAM is avoided. Accordingly, according to the imaging apparatus 10, even in a case where the memory 64 is the DRAM, output of the digital image data 69B from the imaging element 44 to the processing portion 45 can be continued.

In addition, in the imaging apparatus 10, the imaging element in which the photoelectric conversion element 61, the processing circuit 62, and the memory 64 are formed in one chip is employed as the imaging element 44. Accordingly, portability of the imaging element 44 is increased, compared to an imaging element in which the photoelectric conversion element 61, the processing circuit 62, and the memory 64 are not formed in one chip. In addition, a degree of design freedom can be increased, compared to a case of the imaging element in which the photoelectric conversion element 61, the processing circuit 62, and the memory 64 are not formed in one chip. Furthermore, it is possible to contribute to size reduction of the imaging apparatus main body 12, compared to a case of the imaging element in which the photoelectric conversion element 61, the processing circuit 62, and the memory 64 are not formed in one chip.

In addition, as illustrated in FIG. 7, the laminated imaging element in which the photoelectric conversion element 61 is laminated with the memory 64 is employed as the imaging element 44. Accordingly, since a wire that connects the photoelectric conversion element 61 to the memory 64 can be shortened, a wire delay can be reduced. Consequently, a transfer speed of the image data 69 from the photoelectric conversion element 61 to the memory 64 can be increased, compared to a case where the photoelectric conversion element 61 and the memory 64 are not laminated. Improving the transfer speed contributes to high-speed processing in the entire processing circuit 62. In addition, the degree of design freedom can be increased, compared to a case of not laminating the photoelectric conversion element 61 and the memory 64. Furthermore, it is possible to contribute to size reduction of the imaging apparatus main body 12, compared to a case of not laminating the photoelectric conversion element 61 and the memory 64.

In addition, in the imaging apparatus 10, the live view image or the like based on the digital image data 69B is displayed on the second display 86. Accordingly, the user can visually recognize an image indicated by the digital image data 69B.

Furthermore, in the imaging apparatus 10, the latest digital image data 69B output to the signal processing circuit 50 from the communication I/F 62E2 is stored in the secondary storage device 80, the USB memory, and/or the memory card or the like by the CPU 46A. In addition, the digital image data 69B earlier by one frame output to the signal processing circuit 50 from the communication I/F 62E3 is stored in the secondary storage device 80, the USB memory, and/or the memory card or the like by the CPU 46A. Accordingly, the digital image data 69B of all frames obtained by imaging the subject can be appropriately managed.

In the first embodiment, while a case of performing the second output in response to the request from the controller 46 is described, the technology of the present disclosure is not limited thereto. For example, the second output may be started on a condition that transfer of the digital image data 69B obtained by the "N+1-th-time digital signal processing" to the communication I/F 62E3 by the selector 62C is started. In addition, the second output may be started on a condition that output of the digital image data 69B obtained by the "N+1-th-time digital signal processing" to the selector 62C by the digital processing circuit 62B is started. In either case, the second output may be started in a period in which writing into the memory 64 is not performed.

In addition, in the first embodiment, while an example of a form in which the digital image data 69B transferred to the communication I/F 62E3 from the selector 62C is output to the signal processing circuit 50 through the communication line 55 is illustratively described, the technology of the present disclosure is not limited thereto. For example, image data that is obtained by performing any image processing on the digital image data 69B by an image processing circuit (not illustrated) between the selector 62C and the communication I/F 62E3 may be output to the signal processing circuit 50 by the communication I/F 62E3. Here, for example, well-known image processing such as thinning processing and addition processing is exemplified as the image processing. The image data obtained by performing any image processing on the digital image data 69B by the image processing circuit between the selector 62C and the communication I/F 62E3 is an example of the "first image data" according to the embodiments of the technology of the present disclosure.

In addition, in the first embodiment, while an example of a form in which the digital image data 69B stored in the memory 64 is output to the signal processing circuit 50 by the communication I/F 62E2 is illustratively described, the technology of the present disclosure is not limited thereto. For example, image data that is obtained by performing the image processing on the digital image data 69B stored in the memory 64 by the control circuit 62D may be output to the signal processing circuit 50 through the communication I/F 62E2. The image data obtained by performing the image processing on the digital image data 69B stored in the memory 64 by the control circuit 62D is an example of the "second image data" according to the embodiments of the technology of the present disclosure.

In addition, in the first embodiment, while an example of a form in which each image based on the digital image data 69B output from each of the communication I/F 62E2 and the communication I/F 62E3 is displayed on the display by the CPU 46A is exemplified, the technology of the present disclosure is not limited thereto. For example, an image based on the digital image data 69B output to the signal processing circuit 50 from the communication I/F 62E2 or the communication I/F 62E3 may be displayed on the display by the CPU 46A.

In addition, in the first embodiment, while an example of a form in which the digital image data 69B output from each of the communication I/F 62E2 and the communication I/F 62E3 is stored in the secondary storage device 80 or the like by the CPU 46A is exemplified, the technology of the present disclosure is not limited thereto. For example, the digital image data 69B output to the signal processing circuit 50 from the communication I/F 62E2 or the communication I/F 62E3 may be stored in the secondary storage device 80 or the like by the CPU 46A.

In addition, while the imaging element in which the photoelectric conversion element 61, the processing circuit 62, and the memory 64 are formed in one chip is illustrated as the imaging element 44 in the first embodiment, the technology of the present disclosure is not limited thereto. For example, at least the photoelectric conversion element 61 and the memory 64 among the photoelectric conversion element 61, the processing circuit 62, and the memory 64 may be formed in one chip.

Second Embodiment

In the first embodiment, an example of a form of performing the first output and the second output in parallel is illustratively described. In a second embodiment, an example of a form of alternately performing the first output and the second output will be described. In the second embodiment, the same constituents as the first embodiment will be designated by the same reference signs and will not be described. Hereinafter, parts different from the first embodiment will be described.

Figure 12:
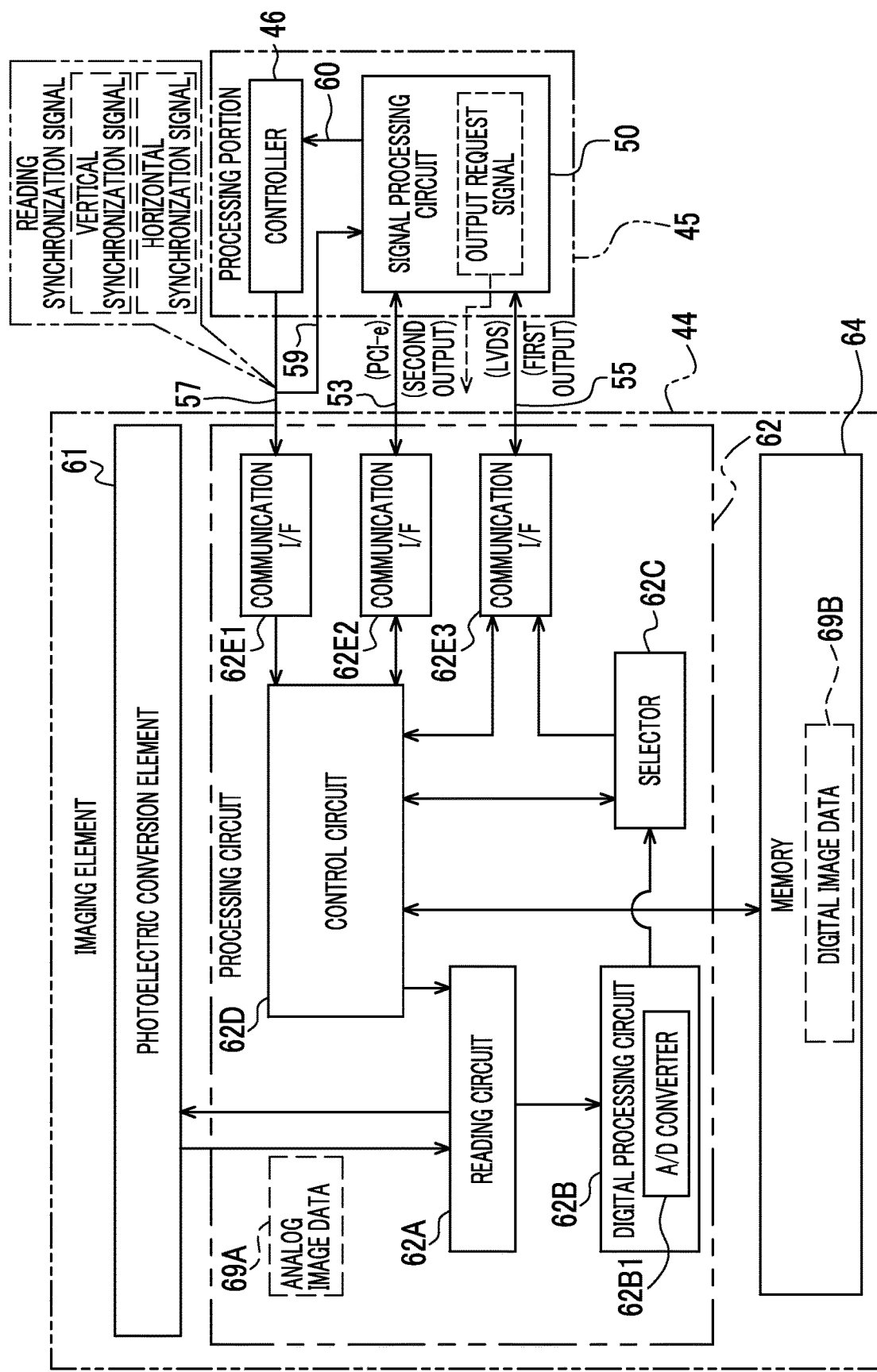
FIG. 12 is a block diagram illustrating an example of a configuration of an electric system of the imaging element included in the imaging apparatus according to the second and third embodiments.

As illustrated in FIG. 12 as an example, the imaging apparatus 10 according to the second embodiment is different from the first embodiment in that a communication line 59 branching from the communication line 57 is connected to the signal processing circuit 50. In description of the second embodiment, for convenience of description, the imaging apparatus 10 according to the second embodiment will be simply referred to as the "imaging apparatus 10".

Since the communication line 59 branching from the communication line 57 is connected to the signal processing circuit 50, the reading synchronization signal output from the controller 46 is input into the signal processing circuit 50 through the communication line 59. Accordingly, the signal processing circuit 50 can perform an operation corresponding to the reading synchronization signal which is input from the controller 46 through the communication line 59.

The vertical synchronization signal is input into the signal processing circuit 50 from the controller 46 through the communication line 59. The signal processing circuit 50 specifies a vertical blanking period in accordance with an input timing of the vertical synchronization signal. In a case where the vertical blanking period is reached, the signal processing circuit 50 generates an output request signal for requesting the processing circuit 62 to start the second output and outputs the generated output request signal to the communication I/F 62E2 through the communication line 53. The output request signal is transferred to the control circuit 62D from the communication I/F 62E2. In a case where the output request signal is transferred to the control circuit 62D from the communication I/F 62E2, the second output is started. In the second output, as described in the first embodiment, the digital image data 69B is transferred using the second transfer path.

That is, in a case where the output request signal is transferred from the communication OF 62E2, the control circuit 62D acquires the digital image data 69B from the memory 64 and outputs the acquired digital image data 69B to the communication OF 62E2. The communication OF 62E2 outputs the digital image data 69B input from the control circuit 62D to the signal processing circuit 50 through the communication line 53.

Figure 13:
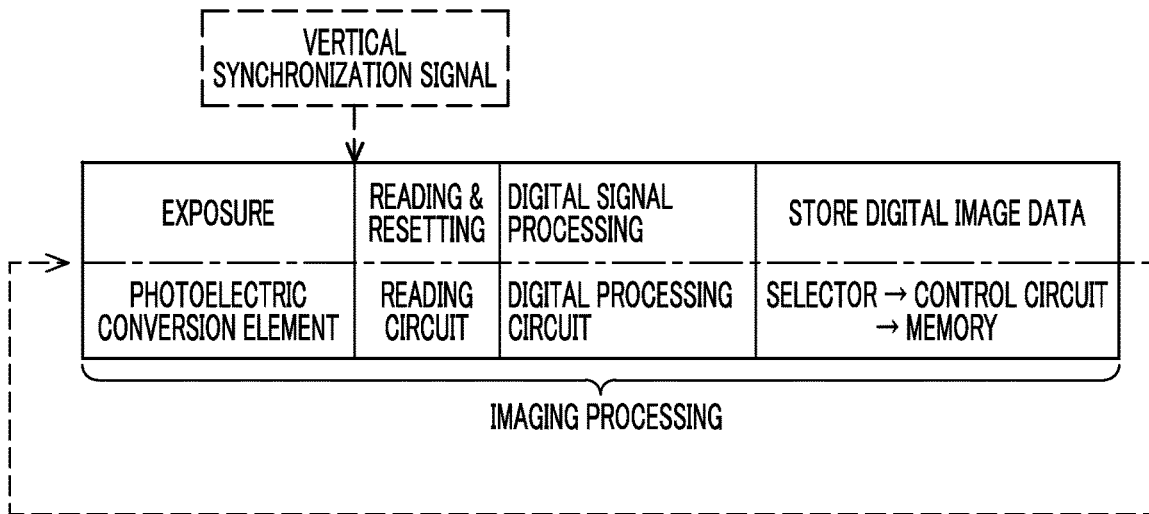
FIG. 13 is a state transition diagram illustrating an example of a time-series processing content of imaging processing according to the second embodiment.
Figure 14:
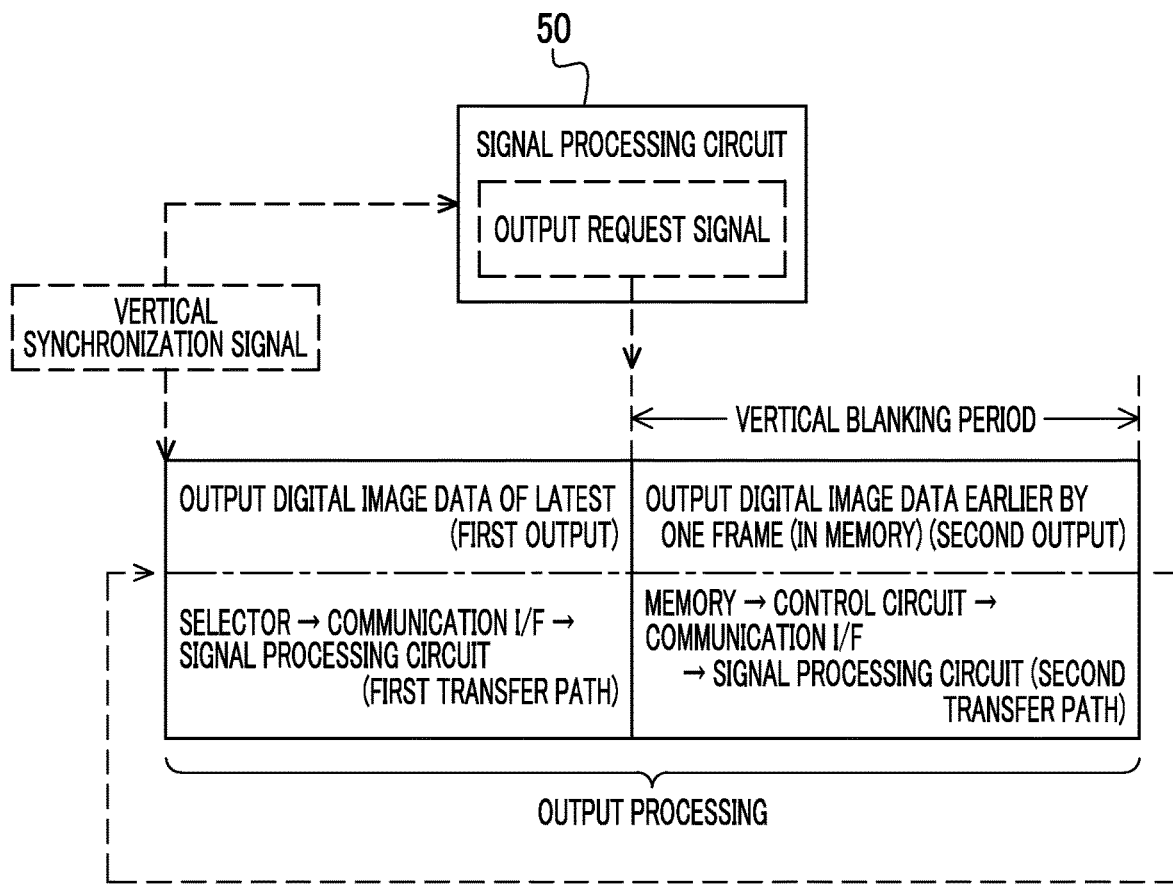
FIG. 14 is a state transition diagram illustrating an example of a time-series processing content of output processing according to the second embodiment.

As illustrated in FIG. 13 and FIG. 14 as an example, in the imaging element 44, the imaging processing and the output processing are performed. In the imaging processing illustrated in FIG. 13, in the same manner as the first embodiment, exposure by the photoelectric conversion element 61, reading of the analog image data 69A, resetting of the photoelectric conversion element 61, the digital signal processing, and storage of the digital image data 69B in the memory 64 are performed.

As illustrated in FIG. 14 as an example, in the output processing, the first output and the second output are alternately performed. In a case where the vertical synchronization signal is input into the processing circuit 62 from the controller 46, the first output described in the first embodiment is performed. In a case where the output request signal is input into the processing circuit 62 from the signal processing circuit 50 in the vertical blanking period, the second output described in the first embodiment is performed.

In a case where the vertical synchronization signal is input into the imaging element 44 from the controller 46, reading of the analog image data 69A of one frame from the photoelectric conversion element 61 is started. The digital image data 69B obtained by performing the digital signal processing on the analog image data 69A is transferred to the control circuit 62D by the selector 62C and stored in the memory 64 by the control circuit 62D. Since the memory 64 is the DRAM, reading from the memory 64 by the control circuit 62D cannot be performed in a period of writing into memory 64 by the control circuit 62D.

Figure 15:
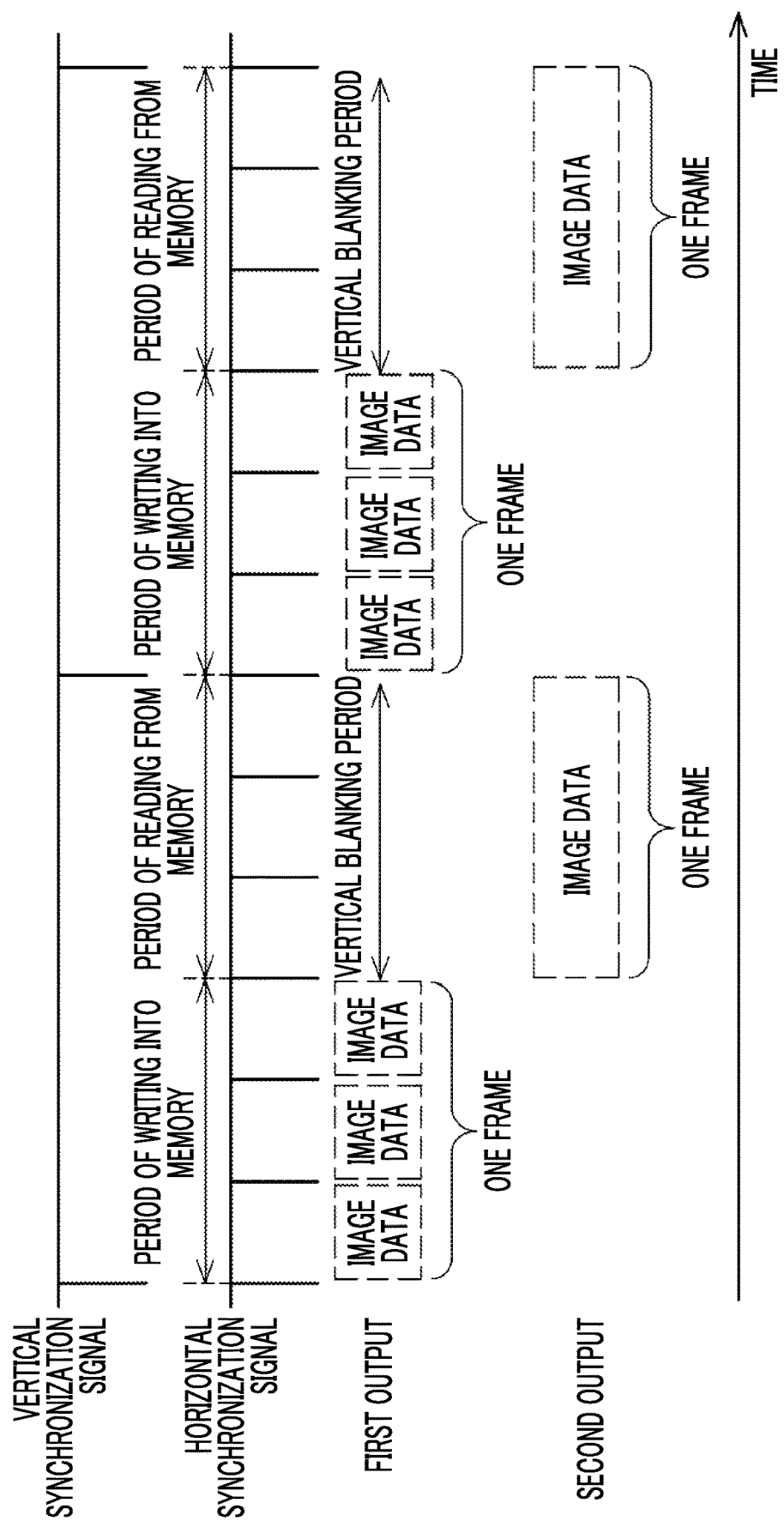
FIG. 15 is a time chart illustrating an example of an aspect of performing the second output in a vertical blanking period and performing the first output before and after the vertical blanking period.

Therefore, as illustrated in FIG. 15 as an example, the first output that does not depend on the control circuit 62D is performed in the period of writing into the memory 64. That is, the latest digital image data 69B of one frame is output to the selector 62C from the digital processing circuit 62B and transferred to the communication OF 62E3 by the selector 62C. The latest digital image data 69B of one frame is output to the signal processing circuit 50 through the communication line 55 by the communication OF 62E3.

In a case where the first output is completed, the vertical blanking period is reached. In the vertical blanking period, since writing into the memory 64 is not performed, reading from the memory 64 by the control circuit 62D can be performed.

Therefore, as illustrated in FIG. 15 as an example, in the vertical blanking period, that is, in a period of reading from the memory 64, the second output that accompanies reading of the digital image data 69B from the memory 64 by the control circuit 62D is performed. That is, the digital image data 69B of one frame obtained earlier by one frame is read out from the memory 64 and transferred to the communication OF 62E2 by the control circuit 62D. The digital image data 69B of one frame read out from the memory 64 is output to the signal processing circuit 50 through the communication line 53 by the communication OF 62E2.

In a case where the vertical synchronization signal is input into the imaging element 44, the first output and the second output are sequentially performed until the vertical synchronization signal is subsequently input into the imaging element 44. Consequently, as illustrated in FIG. 15 as an example, the first output and the second output are alternately performed. This means that the first output is performed in a period different from a period in which the second output is performed. That is, the second output is performed in the vertical blanking period before the first output and the vertical blanking period after the first output. The period different from the period in which the second output is performed is an example of a "period different from a period of output of the second image data by a second output portion" according to the embodiments of the technology of the present disclosure.

Next, an action of the imaging apparatus 10 will be described.

First, a flow of imaging processing executed by the processing circuit 62 of the imaging element 44 will be described with reference to FIG. 16.

Figure 16:
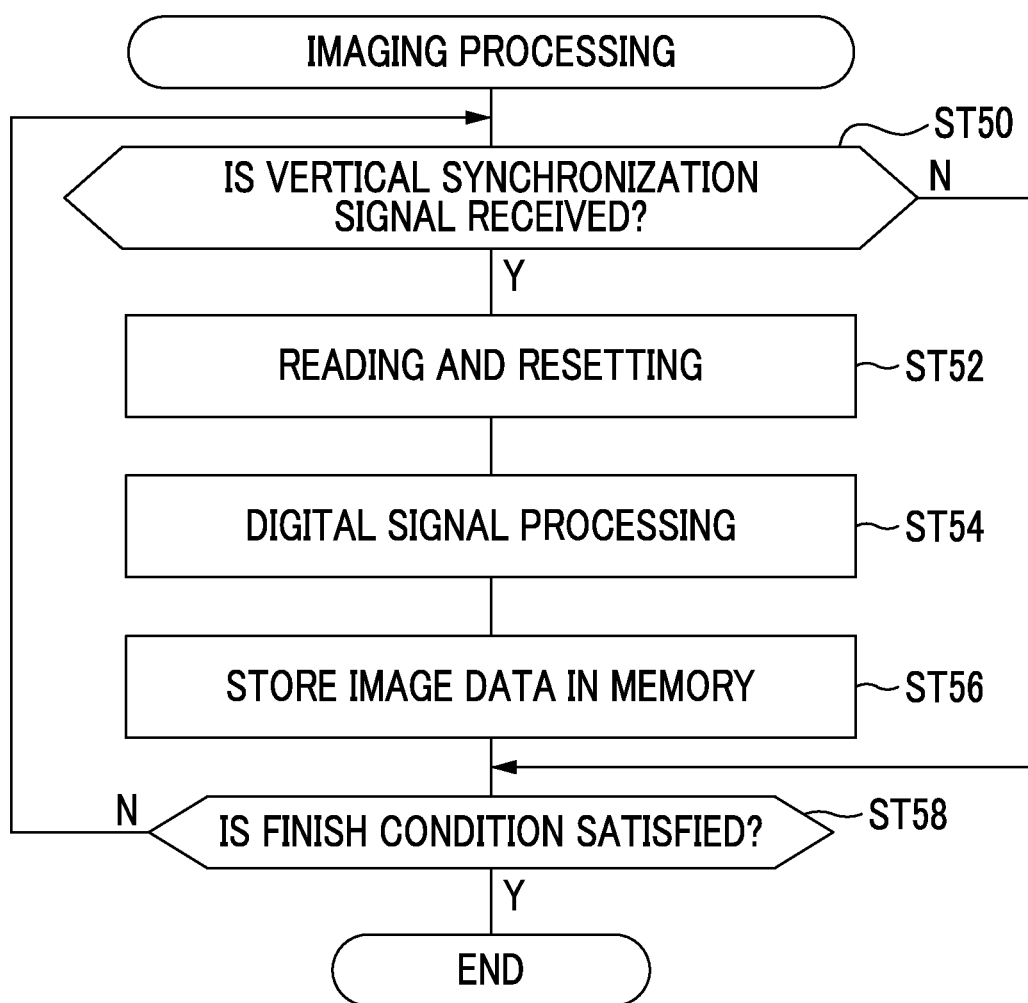
FIG. 16 is a flowchart illustrating an example of a flow of imaging processing according to the second embodiment.

In the imaging processing illustrated in FIG. 16, first, in step ST50, the control circuit 62D determines whether or not the vertical synchronization signal from the controller 46 is received by the communication OF 62E1. In step ST50, in a case where the vertical synchronization signal from the controller 46 is not received by the communication OF 62E1, a negative determination is made, and the imaging processing transitions to step ST58. In step ST50, in a case where the vertical synchronization signal from the controller 46 is received by the communication OF 62E1, a positive determination is made, and the imaging processing transitions to step ST52.

In step ST52, the reading circuit 62A reads out the analog image data 69A and resets the photoelectric conversion element 61. Then, the imaging processing transitions to step ST54.

In step ST54, the digital processing circuit 62B performs the digital signal processing on the analog image data 69A. Then, the imaging processing transitions to step ST56.

The digital image data 69B obtained by performing the digital signal processing on the analog image data 69A in step ST54 is output to the selector 62C. The selector 62C transfers the digital image data 69B to the control circuit 62D.

In step ST56, the control circuit 62D stores the digital image data 69B in the memory 64. Then, the imaging processing transitions to step ST58.

In step ST58, the control circuit 62D determines whether or not a condition (hereinafter, referred to as an "imaging processing finish condition") under which the imaging processing is finished is satisfied. A condition that an instruction to finish the imaging processing is received by the reception device 84 (refer to FIG. 5) is exemplified as an example of the imaging processing finish condition. In step ST58, in a case where the imaging processing finish condition is not satisfied, a negative determination is made, and the imaging processing transitions to step ST50. In step ST58, in a case where the imaging processing finish condition is satisfied, a positive determination is made, and the imaging processing is finished.

Next, a flow of output processing executed by the processing circuit 62 of the imaging element 44 will be described with reference to FIG. 17.

Figure 17:
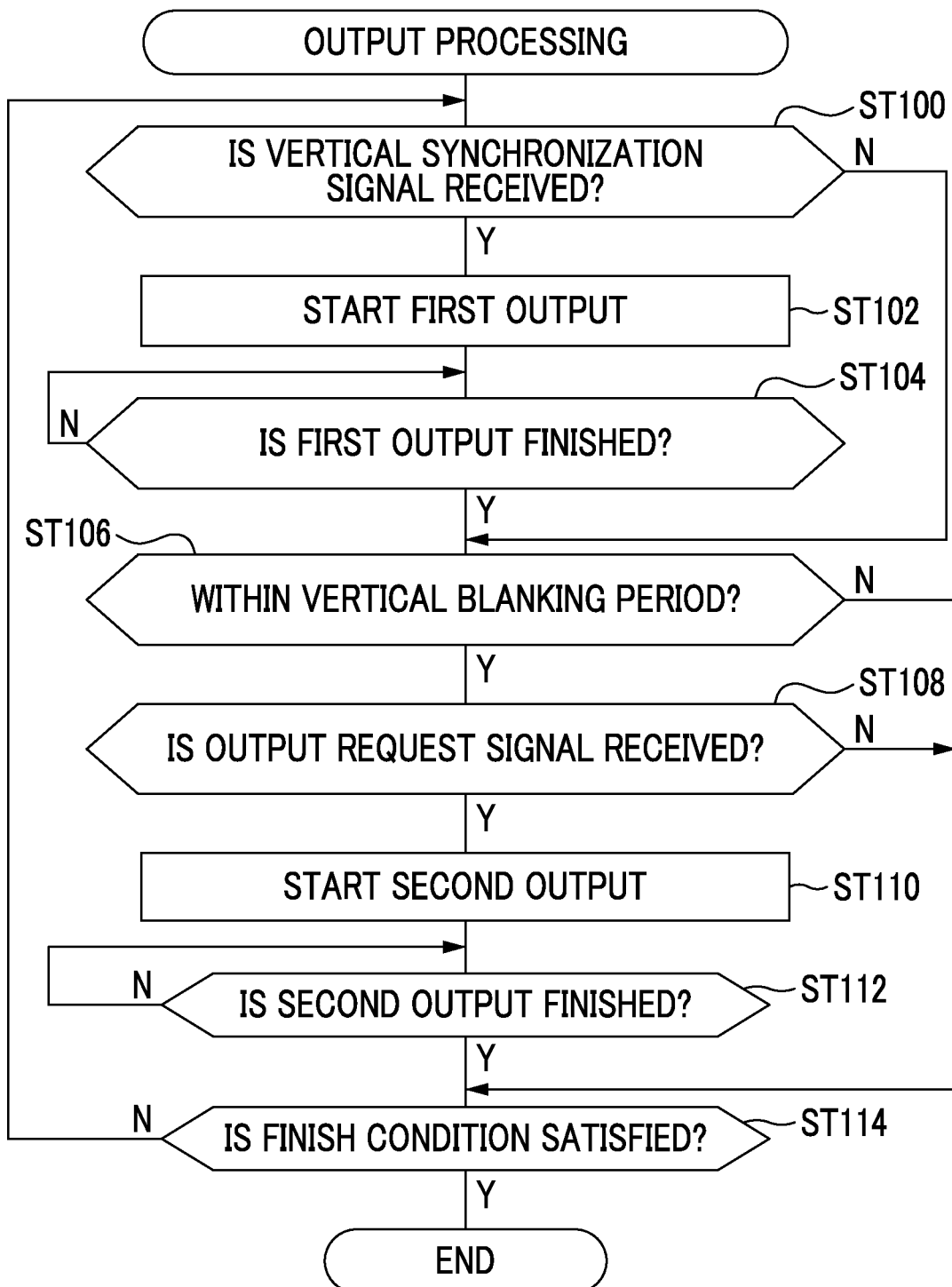
FIG. 17 is a flowchart illustrating an example of a flow of output processing according to the second embodiment.

In the output processing illustrated in FIG. 17, in step ST100, the control circuit 62D determines whether or not the vertical synchronization signal from the controller 46 is received by the communication OF 62E1. In step ST100, in a case where the vertical synchronization signal from the controller 46 is not received by the communication OF 62E1, a negative determination is made, and the output processing transitions to step ST106. In step ST100, in a case where the vertical synchronization signal from the controller 46 is received by the communication OF 62E1, a positive determination is made, and the output processing transitions to step ST102.

In step ST102, the control circuit 62D starts the first output by controlling the selector 62C and the communication OF 62E3. Then, the output processing transitions to step ST104. While the first output is performed, the imaging processing illustrated in FIG. 16 is executed, and the digital image data 69B is written into the memory 64.

In step ST104, the control circuit 62D determines whether or not the first output is finished. A finish of the first output refers to a finish of output of the latest digital image data 69B of one frame. In step ST104, in a case where the first output is not finished, a negative determination is made, and the determination of step ST104 is performed again. In step ST104, in a case where the first output is finished, a positive determination is made, and the output processing transitions to step ST106.

In step ST106, the control circuit 62D determines whether or not the vertical blanking period is reached. In step ST106, in a case where the vertical blanking period is not reached, a negative determination is made, and the output processing transitions to step ST114. In step ST106, in a case where the vertical blanking period is reached, a positive determination is made, and the output processing transitions to step ST108.

In a case where the vertical blanking period is reached, the output request signal is output to the communication OF 62E2 from the signal processing circuit 50 through the communication line 53.

Therefore, in step ST108, the control circuit 62D determines whether or not the output request signal is received by the communication OF 62E2. In step ST108, in a case where the output request signal is not received by the communication OF 62E2, a negative determination is made, and the output processing transitions to step ST114. In step ST108, in a case where the output request signal is received by the communication OF 62E2, a positive determination is made, and the output processing transitions to step ST110.

In step ST110, the control circuit 62D starts the second output. Then, the output processing transitions to step ST112. In a case where the second output is started, the digital image data 69B of one frame stored in the memory 64 is read out and output to the signal processing circuit 50 through the communication line 53 by the communication OF 62E2.

In step ST112, the control circuit 62D determines whether or not the second output is finished. A finish of the second output refers to a finish of output of the digital image data 69B of one frame stored in the memory 64, that is, the digital image data 69B of one frame obtained earlier by one frame. In step ST112, in a case where the second output is not finished, a negative determination is made, and the determination of step ST112 is performed again. In step ST112, in a case where the second output is finished, a positive determination is made, and the output processing transitions to step ST114.

In step ST114, the control circuit 62D determines whether or not a condition (hereinafter, referred to as an "output processing finish condition") under which the output processing is finished is satisfied. A condition that an instruction to finish the output processing is received by the reception device 84 (refer to FIG. 5) is exemplified as an example of the output processing finish condition. In step ST114, in a case where the output processing finish condition is not satisfied, a negative determination is made, and the output processing transitions to step ST100. In step ST114, in a case where the output processing finish condition is satisfied, a positive determination is made, and the output processing is finished.

As described above, in the imaging apparatus 10, the first output is performed in the period different from the period in which the second output is performed. Accordingly, the digital image data 69B can be output to the signal processing circuit 50 without delay.

In addition, in the imaging apparatus 10, the second output is performed in the vertical blanking period before the first output and the vertical blanking period after the first output. Accordingly, a delay in output of the digital image data 69B from the imaging element 44 to the signal processing circuit 50 due to a writing operation for the memory 64 can be avoided.

In the second embodiment, while an example of a form in which the second output is performed in both of the vertical blanking period before the first output and the vertical blanking period after the first output is illustratively described, the technology of the present disclosure is not limited thereto. The second output may be performed in the vertical blanking period before the first output or the vertical blanking period after the first output.

Third Embodiment

In the second embodiment, an example of a form of alternately performing the first output and the second output in accordance with input of the vertical synchronization signal is illustrated. In a third embodiment, a case of alternately performing the first output and the second output in accordance with input of the horizontal synchronization signal will be described. In the third embodiment, the same constituents as the second embodiment will be designated by the same reference signs and will not be described. Hereinafter, parts different from the second embodiment will be described.

Figure 18:
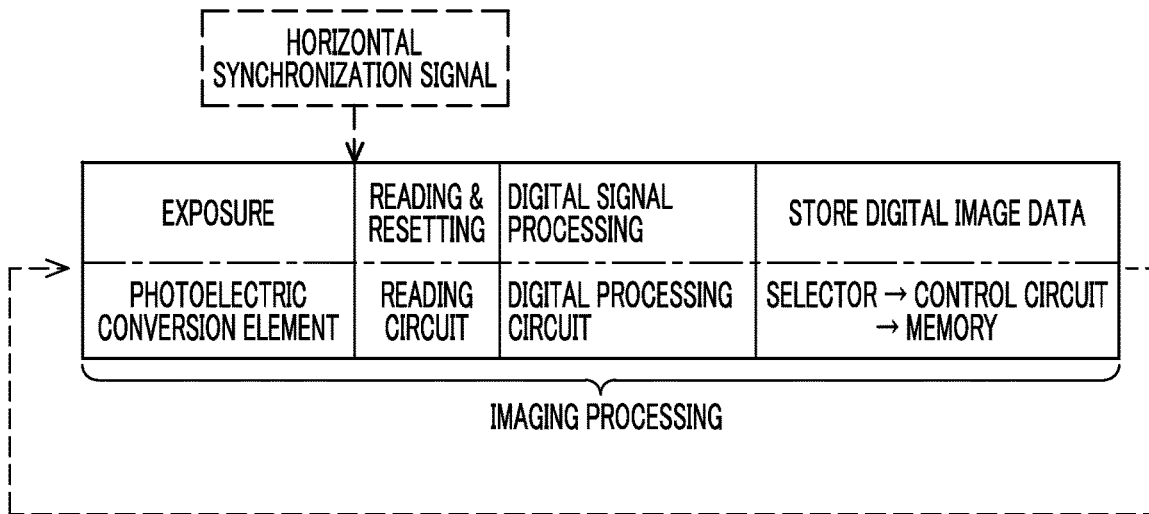
FIG. 18 is a state transition diagram illustrating an example of a time-series processing content of imaging processing according to the third embodiment.
Figure 19:
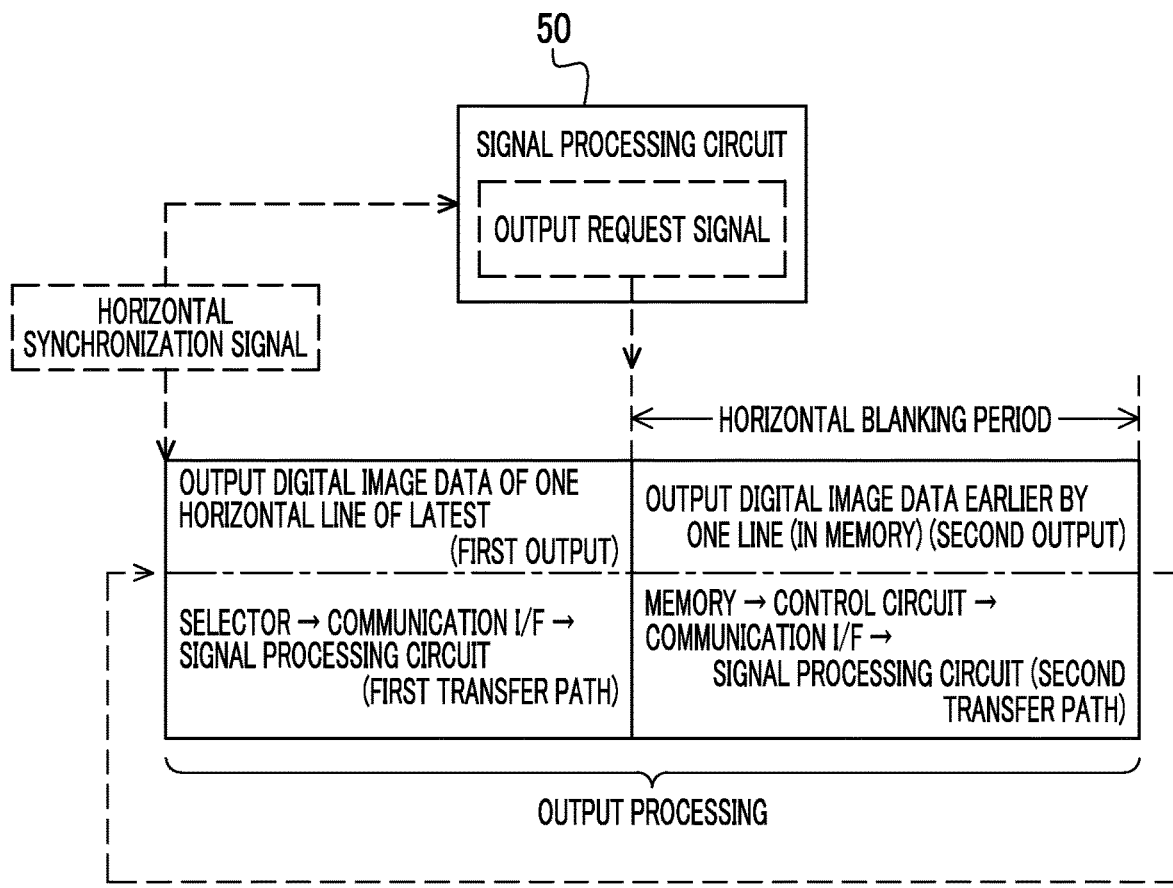
FIG. 19 is a state transition diagram illustrating an example of a time-series processing content of output processing according to the third embodiment.

In the imaging apparatus 10 according to the third embodiment, as illustrated in FIG. 18 and FIG. 19 as an example, the imaging processing and the output processing are performed. In the imaging processing illustrated in FIG. 18, exposure by the photoelectric conversion element 61, reading of the analog image data 69A, resetting of the photoelectric conversion element 61, the digital signal processing, and storage of the digital image data 69B in the memory 64 are performed.

As illustrated in FIG. 12 as an example, the horizontal synchronization signal is input into the signal processing circuit 50 from the controller 46 through the communication line 59. The signal processing circuit 50 specifies a horizontal blanking period in accordance with an input timing of the horizontal synchronization signal. In a case where the horizontal blanking period is reached, the signal processing circuit 50 generates the output request signal for requesting the processing circuit 62 to start the second output and outputs the generated output request signal to the communication OF 62E2 through the communication line 53. The output request signal is transferred to the control circuit 62D from the communication OF 62E2. In a case where the output request signal is transferred to the control circuit 62D from the communication OF 62E2, the second output is started. In the second output, as described in the first and second embodiments, the digital image data 69B is transferred using the second transfer path.

As illustrated in FIG. 18 and FIG. 19 as an example, in the imaging element 44, the imaging processing and the output processing are performed. In the imaging processing illustrated in FIG. 18, in the same manner as the first embodiment, exposure by the photoelectric conversion element 61, reading of the analog image data 69A, resetting of the photoelectric conversion element 61, the digital signal processing, and storage of the digital image data 69B in the memory 64 are performed.

In a case where the horizontal synchronization signal is input into the imaging element 44 from the controller 46, as illustrated in FIG. 18 as an example, reading of the analog image data 69A of one horizontal line and resetting of the photoelectric conversion element 61 are performed, and the digital signal processing is performed on the read analog image data 69A of one horizontal line. The digital image data 69B of one horizontal line obtained by performing the digital signal processing on the analog image data 69A of one horizontal line is output to the selector 62C from the digital processing circuit 62B. The digital image data 69B of one horizontal line is transferred to the control circuit 62D from the selector 62C and stored in the memory 64 by the control circuit 62D.

As illustrated in FIG. 19 as an example, in the output processing, the first output and the second output are alternately performed. In a case where the horizontal synchronization signal is input into the processing circuit 62 from the controller 46, the first output is performed. In a case where the output request signal is input into the processing circuit 62 from the signal processing circuit 50 in the horizontal blanking period, the second output is performed.

In a case where the horizontal synchronization signal is input into the imaging element 44 from the controller 46, reading of the analog image data 69A of one horizontal line from the photoelectric conversion element 61 is started. The digital image data 69B of one horizontal line obtained by performing the digital signal processing on the analog image data 69A of one horizontal line is transferred to the control circuit 62D by the selector 62C and stored in the memory 64 by the control circuit 62D. Since the memory 64 is the DRAM, reading from the memory 64 by the control circuit 62D cannot be performed in the period of writing into memory 64 by the control circuit 62D.

Figure 20:
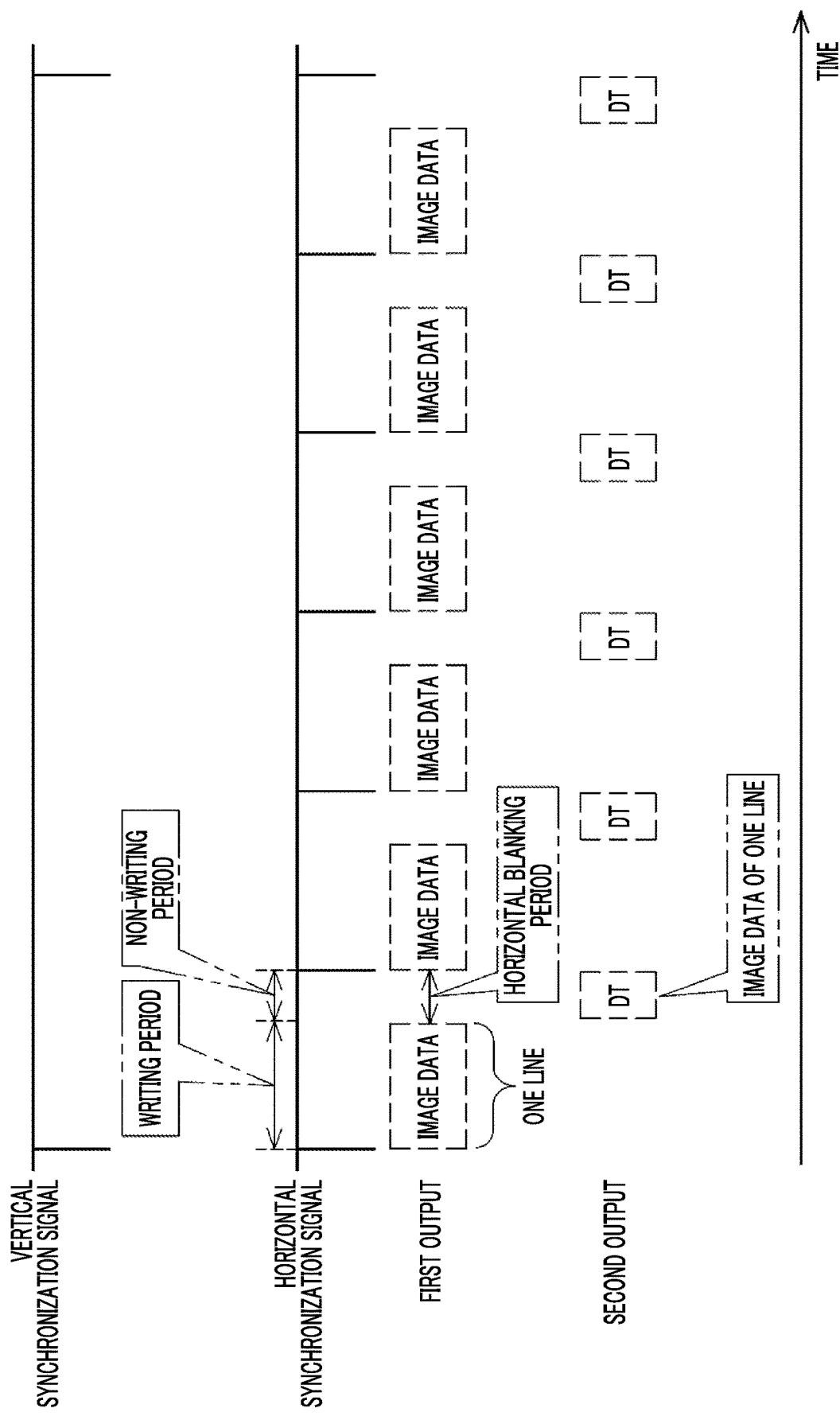
FIG. 20 is a time chart illustrating an example of an aspect of performing the second output in a horizontal blanking period and performing the first output before and after the horizontal blanking period.

Therefore, as illustrated in FIG. 20 as an example, the first output that does not depend on the control circuit 62D is performed in the period ("writing period" illustrated in FIG. 20) of writing into the memory 64. That is, the latest digital image data 69B of one horizontal line is output to the selector 62C from the digital processing circuit 62B and transferred to the communication OF 62E3 by the selector 62C. The latest digital image data 69B of one horizontal line is output to the signal processing circuit 50 through the communication line 55 by the communication OF 62E3.

In a case where the first output is completed, the horizontal blanking period is reached. The horizontal blanking period is a non-writing period. The non-writing period refers to a period in which writing into the memory 64 is not performed. In such a manner, in the horizontal blanking period, since writing into the memory 64 is not performed, reading from the memory 64 by the control circuit 62D can be performed.

Therefore, as illustrated in FIG. 20 as an example, in the horizontal blanking period, that is, in the period of reading from the memory 64, the second output that accompanies reading of the digital image data 69B from the memory 64 by the control circuit 62D is performed. That is, the digital image data 69B of one horizontal line obtained earlier by one line is read out from the memory 64 and transferred to the communication OF 62E2 by the control circuit 62D. The digital image data 69B of one horizontal line read out from the memory 64 is output to the signal processing circuit 50 through the communication line 53 by the communication OF 62E2.

In a case where the horizontal synchronization signal is input into the imaging element 44, the first output and the second output are sequentially performed until the horizontal synchronization signal is subsequently input into the imaging element 44. Consequently, as illustrated in FIG. 20 as an example, the first output and the second output are alternately performed. This means that the first output is performed in the period different from the period in which the second output is performed. That is, the second output is performed in the horizontal blanking period before the first output and the horizontal blanking period after the first output. Here, "DT" illustrated in FIG. 20 means the digital image data 69B of one line.

Next, an action of the imaging apparatus 10 will be described.

First, a flow of imaging processing executed by the processing circuit 62 of the imaging element 44 will be described with reference to FIG. 21.

Figure 21:
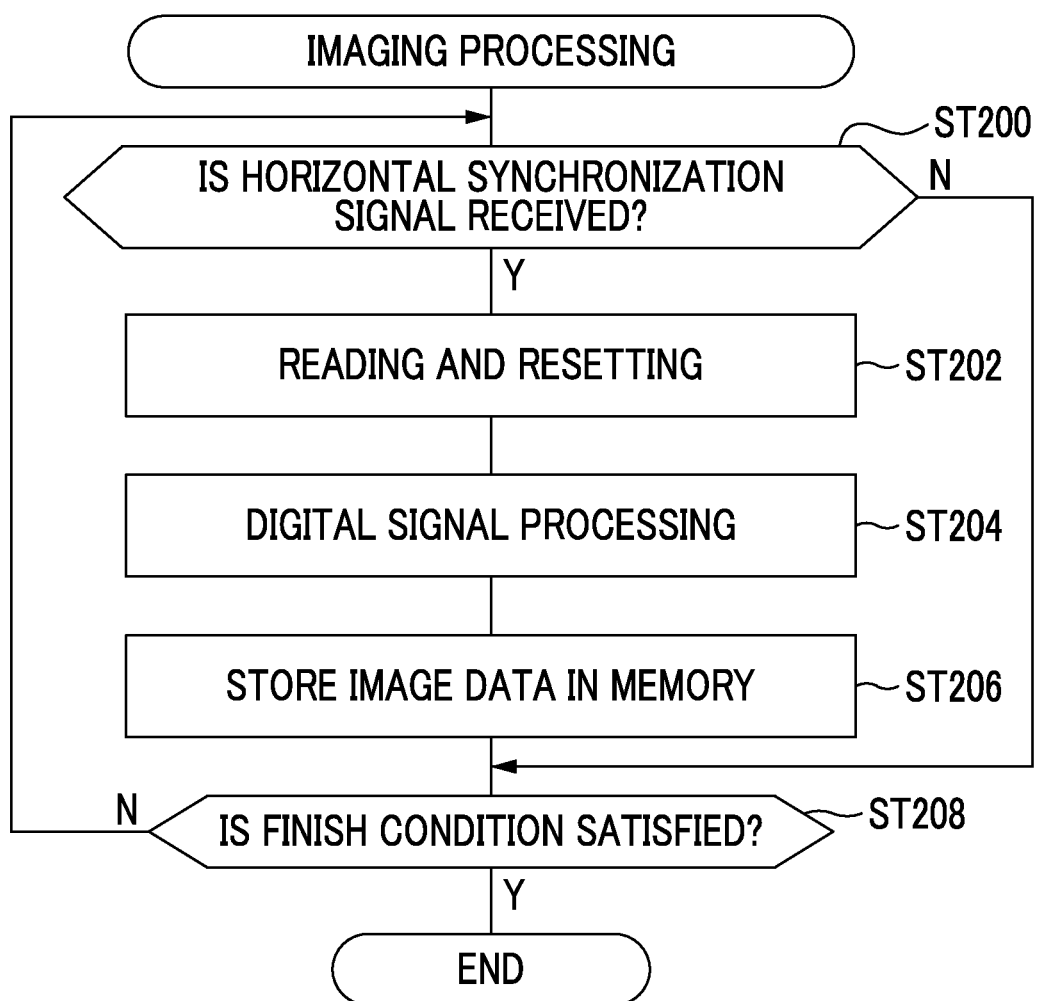
FIG. 21 is a flowchart illustrating an example of a flow of imaging processing according to the third embodiment.

In the imaging processing illustrated in FIG. 21, first, in step ST200, the control circuit 62D determines whether or not the horizontal synchronization signal from the controller 46 is received by the communication OF 62E1. In step ST200, in a case where the horizontal synchronization signal from the controller 46 is not received by the communication OF 62E1, a negative determination is made, and the imaging processing transitions to step ST208. In step ST200, in a case where the horizontal synchronization signal from the controller 46 is received by the communication OF 62E1, a positive determination is made, and the imaging processing transitions to step ST202.

In step ST202, the reading circuit 62A reads out the analog image data 69A and resets the photoelectric conversion element 61. Then, the imaging processing transitions to step ST204.

In step ST204, the digital processing circuit 62B performs the digital signal processing on the analog image data 69A. Then, the control processing transitions to step ST206.

The digital image data 69B obtained by performing the digital signal processing on the analog image data 69A in step ST204 is output to the selector 62C. The selector 62C transfers the digital image data 69B to the control circuit 62D.

In step ST206, the control circuit 62D stores the digital image data 69B in the memory 64. Then, the imaging processing transitions to step ST208.

In step ST208, the control circuit 62D determines whether or not the imaging processing finish condition is satisfied. In step ST208, in a case where the imaging processing finish condition is not satisfied, a negative determination is made, and the imaging processing transitions to step ST200. In step ST208, in a case where the imaging processing finish condition is satisfied, a positive determination is made, and the imaging processing is finished.

Next, a flow of output processing executed by the processing circuit 62 of the imaging element 44 will be described with reference to FIG. 22.

Figure 22:
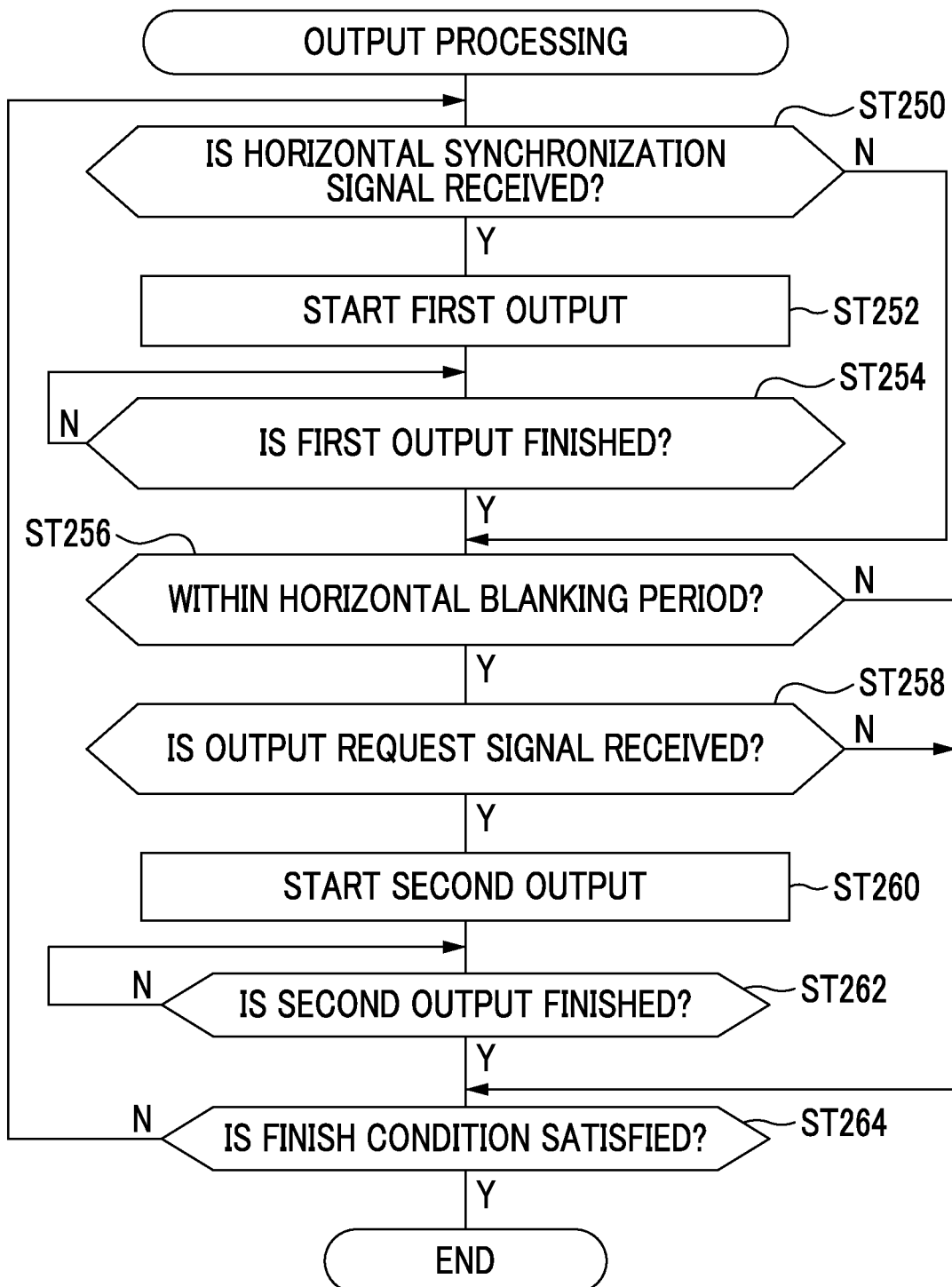
FIG. 22 is a flowchart illustrating an example of a flow of output processing according to the third embodiment.

In the output processing illustrated in FIG. 22, in step ST250, the control circuit 62D determines whether or not the horizontal synchronization signal from the controller 46 is received by the communication OF 62E1. In step ST250, in a case where the horizontal synchronization signal from the controller 46 is not received by the communication OF 62E1, a negative determination is made, and the output processing transitions to step ST256. In step ST250, in a case where the horizontal synchronization signal from the controller 46 is received by the communication OF 62E1, a positive determination is made, and the output processing transitions to step ST252.

In step ST252, the control circuit 62D starts the first output by controlling the selector 62C and the communication OF 62E3. Then, the output processing transitions to step ST254. While the first output is performed, the imaging processing illustrated in FIG. 18 is executed, and the digital image data 69B is written into the memory 64.

In step ST254, the control circuit 62D determines whether or not the first output is finished. The finish of the first output refers to a finish of output of the latest digital image data 69B of one horizontal line. In step ST254, in a case where the first output is not finished, a negative determination is made, and the determination of step ST254 is performed again. In step ST254, in a case where the first output is finished, a positive determination is made, and the output processing transitions to step ST256.

In step ST256, the control circuit 62D determines whether or not the horizontal blanking period is reached. In step ST256, in a case where the horizontal blanking period is not reached, a negative determination is made, and the output processing transitions to step ST264. In step ST256, in a case where the horizontal blanking period is reached, a positive determination is made, and the output processing transitions to step ST258.

In a case where the horizontal blanking period is reached, the output request signal is output to the communication I/F 62E2 from the signal processing circuit 50 through the communication line 53.

Therefore, in step ST258, the control circuit 62D determines whether or not the output request signal is received by the communication I/F 62E2. In step ST258, in a case where the output request signal is not received by the communication I/F 62E2, a negative determination is made, and the output processing transitions to step ST264. In step ST258, in a case where the output request signal is received by the communication I/F 62E2, a positive determination is made, and the output processing transitions to step ST260.

In step ST260, the control circuit 62D starts the second output. Then, the output processing transitions to step ST262. In a case where the second output is started, the digital image data 69B of one frame stored in the memory 64 is read out and output to the signal processing circuit 50 through the communication line 53 by the communication I/F 62E2.

In step ST262, the control circuit 62D determines whether or not the second output is finished. A finish of the second output refers to a finish of output of the digital image data 69B of one frame stored in the memory 64, that is, the digital image data 69B of one frame obtained earlier by one frame. In step ST262, in a case where the second output is not finished, a negative determination is made, and the determination of step ST262 is performed again. In step ST262, in a case where the second output is finished, a positive determination is made, and the output processing transitions to step ST264.

In step ST264, the control circuit 62D determines whether or not the output processing finish condition is satisfied. In step ST264, in a case where the output processing finish condition is not satisfied, a negative determination is made, and the output processing transitions to step ST250. In step ST264, in a case where the output processing finish condition is satisfied, a positive determination is made, and the output processing is finished.

As described above, in the imaging apparatus 10, the second output is performed in the horizontal blanking period before the first output and the horizontal blanking period after the first output. Accordingly, a delay in output of the digital image data 69B from the imaging element 44 to the signal processing circuit 50 due to the writing operation for the memory 64 can be avoided.

In the third embodiment, while an example of a form in which the second output is performed in both of the horizontal blanking period before the first output and the horizontal blanking period after the first output is illustratively described, the technology of the present disclosure is not limited thereto. The second output may be performed in the horizontal blanking period before the first output or the horizontal blanking period after the first output.

In addition, in the third embodiment, while a case of performing the second output in the horizontal blanking period is described, the technology of the present disclosure is not limited thereto. For example, as illustrated in FIG. 23A, the second output may be performed in a digital signal processing period before the first output. Here, the digital signal processing period refers to a period in which the digital signal processing is performed by the digital processing circuit 62B. The digital signal processing period is included in the non-writing period. In the non-writing period, since writing into the memory 64 is not performed, the digital image data 69B can be read out from the memory 64. That is, the digital image data 69B can be transferred to the signal processing circuit 50 from the memory 64 using the second transfer path. As illustrated in FIG. 23A as an example, by performing the second output in the digital signal processing period, a delay in output of the digital image data 69B from the imaging element 44 to the signal processing circuit 50 due to the writing operation for the memory 64 can be avoided.

In addition, an A/D conversion period is included in the digital signal processing period. The A/D conversion period refers to a period in which the A/D conversion is performed by the A/D converter 62B1 (refer to FIG. 12). In such a manner, since the A/D conversion period is included in the digital signal processing period, the second output may be performed in the A/D conversion period as illustrated in FIG. 23B as an example. Accordingly, a delay in output of the digital image data 69B from the imaging element 44 to the signal processing circuit 50 due to the writing operation for the memory 64 can be avoided.

In addition, while an example of a form of implementing the processing circuit 62 by a device including an ASIC and an FPGA is illustratively described in each of the embodiments, the technology of the present disclosure is not limited thereto. For example, the imaging processing may be implemented by a software configuration using a computer.

Figure 24:
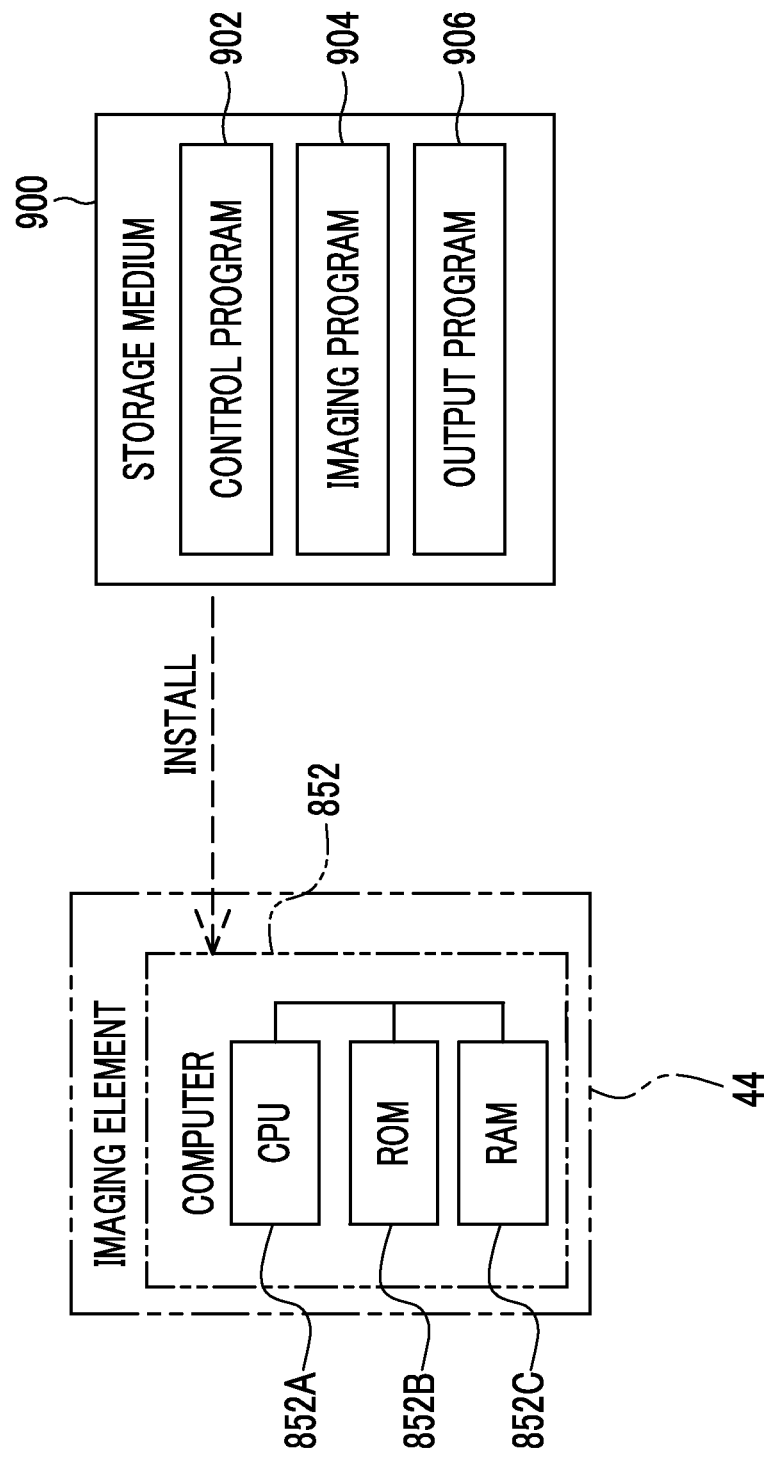
FIG. 24 is a conceptual diagram illustrating an example of an aspect in which various programs are installed on a computer in the imaging element from a storage medium storing the various programs.

In this case, for example, as illustrated in FIG. 24, various programs causing a computer 852 incorporated in the imaging element 44 to execute the control processing, the imaging processing, and the output processing are stored in a storage medium 900.

The various programs refer to a control program 902, an imaging program 904, and an output program 906. The control program 902 is a program causing the computer 852 to execute the control processing. The imaging program 904 is a program causing the computer 852 to execute the imaging processing. The output program 906 is a program causing the computer 852 to execute the output processing.

As illustrated in FIG. 24 as an example, the computer 852 comprises a CPU 852A, a ROM 852B, and a RAM 852C. The various programs stored in the storage medium 900 are installed on the computer 852. The CPU 852A executes the control processing in accordance with the control program 902. In addition, the CPU 852A executes the imaging processing in accordance with the imaging program 904. Furthermore, the CPU 852A executes the output processing in accordance with the output program 906.

While a single CPU is illustrated as the CPU 852A here, the technology of the present disclosure is not limited thereto. A plurality of CPUs may be employed instead of the CPU 852A. The storage medium 900 is a non-temporary storage medium. Any portable storage medium such as an SSD or a USB memory is exemplified as an example of the storage medium 900.

While the various programs are stored in the storage medium 900 in the example illustrated in FIG. 24, the technology of the present disclosure is not limited thereto. For example, the various programs may be stored in advance in the ROM 852B, and the CPU 852A may read out the various programs from the ROM 852B, load the various programs into the RAM 852C, and execute the loaded various programs.

In addition, the various programs may be stored in a storage portion of another computer, a server apparatus, or the like connected to the computer 852 through a communication network (not illustrated), and the various programs may be downloaded to the computer 852 in response to a request from the imaging apparatus 10. In this case, the downloaded various programs are executed by the CPU 852A of the computer 852.

In addition, the computer 852 may be disposed on the outside of the imaging element 44. In this case, the computer 852 may control the processing circuit 62 in accordance with the various programs.

The following various processors can be used as a hardware resource for executing the control processing, the imaging processing, and the output processing (hereinafter, referred to as "various types of processing") described in each of the embodiments. For example, as described above, a CPU that is a general-purpose processor functioning as the hardware resource for executing the various types of processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor.

The hardware resource for executing the various types of processing may be configured with one of those various processors or may be configured with a combination of two or more processors of the same type or different types (for example, a combination of a plurality of FPGAs or a combination of a CPU and an FPGA). In addition, the hardware resource for executing the various types of processing may be one processor.

As an example of a configuration with one processor, first, as represented by a computer such as a client and a server, a form in which one processor is configured with a combination of one or more CPUs and software, and in which this processor functions as a hardware resource for executing in-imaging element processing is available. Second, as represented by a system-on-a-chip (SoC) or the like, a form of using a processor that implements, by one IC chip, a function of the entire system including a plurality of hardware resources for executing the various types of processing is available. In such a manner, the in-imaging element processing is implemented using one or more of the various processors as the hardware resource.

Furthermore, as a hardware structure of those various processors, more specifically, an electric circuit in which circuit elements such as semiconductor elements are combined can be used.

Figure 25:
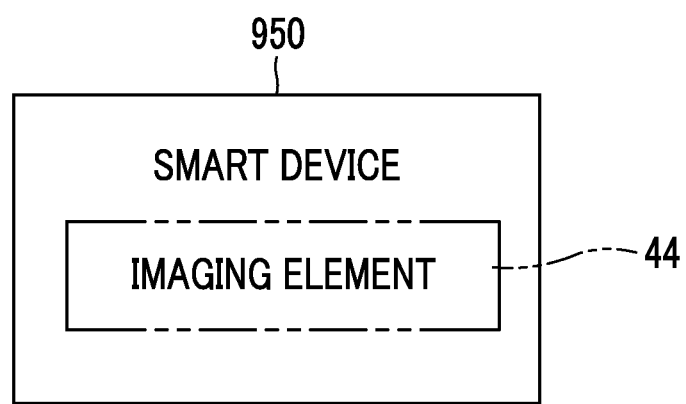
FIG. 25 is a block diagram illustrating an example of a schematic configuration of a smart device incorporating the imaging element according to the first to third embodiments.

While an interchangeable lens camera is illustrated as the imaging apparatus 10 in each of the embodiments, the technology of the present disclosure is not limited thereto. For example, the technology of the present disclosure may be applied to a smart device 950 illustrated in FIG. 25. The smart device 950 illustrated in FIG. 25 as an example is an example of the imaging apparatus according to the embodiments of the technology of the present disclosure. The imaging element 44 described in the embodiments is mounted in the smart device 950. Even with the smart device 950 configured in such a manner, the same actions and effects as the imaging apparatus 10 described in each of the embodiments are obtained. The technology of the present disclosure can be applied to not only the smart device 950 but also a personal computer or a wearable terminal apparatus.

In addition, while the first display 32 and the second display 86 are illustrated in each of the embodiments, the technology of the present disclosure is not limited thereto. For example, a separate display that is retrofit into the imaging apparatus main body 12 may be used as the "display portion (display)" according to the embodiments of the technology of the present disclosure.

In addition, the various types of processing are merely an example. Accordingly, unnecessary steps may be deleted, new steps may be added, or a processing order may be rearranged without departing from a gist of the present disclosure.

Above described contents and illustrated contents are detailed description for parts according to the embodiments of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiments of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, and technical standards are specifically and individually indicated to be incorporated by reference.

What is claimed is:

1. An imaging element comprising:
   a processor; and
   a memory, wherein:
   the processor includes a first communication interface and a second communication interface,
   the first communication interface outputs, as first image data, image data obtained by imaging a subject to an external processor arranged exterior to the imaging element,
   the memory stores the image data,
   the second communication interface outputs, as second image data, the image data stored in the memory to the external processor,
   an output method of the first communication interface and an output method of the second communication interface are different,
   the first communication interface outputs, as the first image data, the image data that is transferred without passing through the memory, and
   a connection standard used for connecting the first communication interface and the external processor is different from a connection standard used for connecting the second communication interface and the external processor.

2. The imaging element according to claim 1, wherein output of the first image data by the first communication interface and output of the second image data by the second communication interface are performed independently of each other.

3. The imaging element according to claim 1, wherein the first communication interface outputs the first image data during a different time period from a period of output of the second image data by the second communication interface.

4. The imaging element according to claim 1, further comprising:
   an A/D converter that performs A/D conversion on analog image data, wherein:
   the processor includes a memory controller that stores digital image data, obtained by the A/D converter digitizing the analog image data, in the memory,
   the output method of the first communication interface is an output method of outputting the digital image data obtained from the A/D converter as the first image data without storing the digital image data in the memory, and
   the output method of the second communication interface is an output method of outputting the digital image data read out from the memory by the memory controller as the second image data.

5. The imaging element according to claim 1, wherein a writing timing and a reading timing of the memory are different.

6. The imaging element according to claim 5, wherein the memory is a DRAM.

7. The imaging element according to claim 1, wherein at least a photoelectric conversion element and the memory are formed in one chip.

8. The imaging element according to claim 7, wherein the imaging element is a layered imaging element in which the photoelectric conversion element is layered with the memory.

9. An imaging apparatus comprising:
the imaging element according to claim 1; and
a display processor configured to perform a control for displaying, on a display, at least one of a first image based on the first image data output by the first communication interface or a second image based on the second image data output by the second communication interface.

10. An imaging apparatus comprising:
the imaging element according to claim 1; and
a storage processor configured to perform a control for storing, in a storage device, at least one of the first image data output by the first communication interface or the second image data output by the second communication interface.

11. An imaging element comprising:
a processor; and
a memory, wherein:
the processor includes a first communication interface and a second communication interface,
the first communication interface outputs, as first image data, image data obtained by imaging a subject to an external processor arranged exterior to the imaging element,
the memory stores the image data,
the second communication interface outputs, as second image data, the image data stored in the memory to the external processor,
an output method of the first communication interface and an output method of the second communication interface are different,
the first communication interface outputs, as the first image data, the image data that is transferred without passing through the memory,
the first communication interface outputs the first image data during a different time period from a period of output of the second image data by the second communication interface, and
the second communication interface outputs the first image data in response to a request from the external processor.

12. An imaging element comprising:
a processor; and
a memory, wherein:
the processor includes a first communication interface and a second communication interface,
the first communication interface outputs, as first image data, image data obtained by imaging a subject to an external processor arranged exterior to the imaging element,
the memory stores the image data,
the second communication interface outputs, as second image data, the image data stored in the memory to the external processor,
an output method of the first communication interface and an output method of the second communication interface are different,
the first communication interface outputs, as the first image data, the image data that is transferred without passing through the memory,
the first communication interface outputs the first image data during a different time period from a period of output of the second image data by the second communication interface, and
the period of output is a vertical blanking period after the first image data for one frame is output from the first communication interface.

13. An imaging element comprising:
a processor; and
a memory, wherein:
the processor includes a first communication interface and a second communication interface,
the first communication interface outputs, as first image data, image data obtained by imaging a subject to an external processor arranged exterior to the imaging element,
the memory stores the image data,
the second communication interface outputs, as second image data, the image data stored in the memory to the external processor,
an output method of the first communication interface and an output method of the second communication interface are different,
the first communication interface outputs, as the first image data, the image data that is transferred without passing through the memory,
the first communication interface outputs the first image data during a different time period from a period of output of the second image data by the second communication interface, and
the period of output is a vertical blanking period before the first image data for one frame is output from the first communication interface.

14. An imaging element comprising:
a processor; and
a memory, wherein:
the processor includes a first communication interface and a second communication interface,
the first communication interface outputs, as first image data, image data obtained by imaging a subject to an external processor arranged exterior to the imaging element,
the memory stores the image data,
the second communication interface outputs, as second image data, the image data stored in the memory to the external processor,
an output method of the first communication interface and an output method of the second communication interface are different,
the first communication interface outputs, as the first image data, the image data that is transferred without passing through the memory,
the first communication interface outputs the first image data during a different time period from a period of output of the second image data by the second communication interface, and
the period of output is a horizontal blanking period after the first image data for one line is output from the first communication interface.

15. An imaging element comprising:
a processor; and
a memory, wherein:
the processor includes a first communication interface and a second communication interface,
the first communication interface outputs, as first image data, image data obtained by imaging a subject to an external processor arranged exterior to the imaging element,
the memory stores the image data,
the second communication interface outputs, as second image data, the image data stored in the memory to the external processor, an output method of the first communication interface and an output method of the second communication interface are different, the first communication interface outputs, as the first image data, the image data that is transferred without passing through the memory, the first communication interface outputs the first image data during a different time period from a period of output of the second image data by the second communication interface, and the period of output is a horizontal blanking period before the first image data for one line is output from the first communication interface.

16. An imaging element comprising:

a processor; and a memory, wherein:

the processor includes a first communication interface and a second communication interface, the first communication interface outputs, as first image data, image data obtained by imaging a subject to an external processor arranged exterior to the imaging element, the memory stores the image data, the second communication interface outputs, as second image data, the image data stored in the memory to the external processor, an output method of the first communication interface and an output method of the second communication interface are different, the first communication interface outputs, as the first image data, the image data that is transferred without passing through the memory, and the first communication interface outputs the first image data during a different time period from a period of output of the second image data by the second communication interface, further comprising:

an A/D converter that performs A/D conversion on analog image data, wherein the period of output is an A/D conversion period of the A/D converter before the first image data for one line is output from the first communication interface.

17. A method of operating an imaging element having a processor and a memory, the processor including a first communication interface and a second communication interface, the method comprising:

by the first communication interface, outputting, as first image data, image data obtained by imaging a subject to an external processor arranged exterior to the imaging element;

by the memory, storing the image data; and by the second communication interface, outputting, as second image data, the image data stored in the memory to the external processor, wherein:

an output method of the first communication interface and an output method of the second communication interface are different, the first communication interface outputs, as the first image data, the image data that is transferred without passing through the memory, and a connection standard used for connecting the first communication interface and the external processor is different from a connection standard used for connecting the second communication interface and the external processor.

18. A non-transitory computer-readable storage medium storing a program executable by a computer to function as a first communication interface and a second communication interface included in an imaging element having a processor and a memory, the processor including the first communication interface and the second communication interface, the program comprising:

by the first communication interface, outputting, as first image data, image data obtained by imaging a subject to an external processor arranged exterior to the imaging element;

by the memory, storing the image data; and by the second communication interface, outputting, as second image data, the image data stored in the memory to the external processor, wherein:

an output method of the first communication interface and an output method of the second communication interface are different, the first communication interface outputs, as the first image data, the image data that is transferred without passing through the memory, and a connection standard used for connecting the first communication interface and the external processor is different from a connection standard used for connecting the second communication interface and the external processor.

* * * * *